United States Patent [19]
Piccirillo et al.

[11] Patent Number: 5,517,646
[45] Date of Patent: May 14, 1996

[54] EXPANSION DEVICE CONFIGURATION SYSTEM HAVING TWO CONFIGURATION MODES WHICH USES AUTOMATIC EXPANSION CONFIGURATION SEQUENCE DURING FIRST MODE AND CONFIGURES THE DEVICE INDIVIDUALLY DURING SECOND MODE

[75] Inventors: Gary J. Piccirillo, Houston; Mark W. Welker, Spring; John S. Thayer, Houston, all of Tex.

[73] Assignee: Compaq Computer Corp., Houston, Tex.

[21] Appl. No.: 233,032

[22] Filed: Apr. 25, 1994

[51] Int. Cl.⁶ .............................. G06F 13/00; G06F 9/00
[52] U.S. Cl. ...................... 395/700; 395/500; 364/929.4; 364/929.5; 364/975.2; 364/945; 364/929.2; 364/DIG. 2
[58] Field of Search .................................... 395/700, 725, 395/775, 800, 575, 500, 325, 200, 200.01

[56] References Cited

U.S. PATENT DOCUMENTS

| | | | |
|---|---|---|---|
| 4,373,181 | 2/1983 | Chrisholm et al. | 395/400 |
| 4,578,773 | 3/1986 | Desai et al. | 395/275 |
| 4,750,136 | 6/1988 | Arpin et al. | 364/514 |
| 4,760,553 | 7/1988 | Buckley et al. | 364/900 |
| 4,800,302 | 1/1989 | Marum | 326/10 |
| 5,038,320 | 8/1991 | Heath et al. | 364/900 |
| 5,111,423 | 5/1992 | Kopec, Jr. et al. | 395/500 |
| 5,161,102 | 11/1992 | Griffin et al. | 395/800 |
| 5,247,682 | 9/1993 | Kondou et al. | 395/700 |
| 5,257,387 | 10/1993 | Richek et al. | 395/800 |
| 5,317,750 | 5/1994 | Wickersheim et al. | 395/725 |
| 5,329,634 | 7/1994 | Thompson | 395/500 |
| 5,367,640 | 11/1994 | Hamilton et al. | 395/827 |
| 5,379,431 | 1/1995 | Lemon et al. | 395/700 |
| 5,418,960 | 5/1995 | Munroe | 395/700 |

OTHER PUBLICATIONS

Jonathan Cassell; "Electronic Buyers News" Nov. 15, 1993, p. 60.
Plug and Play ISA Specification, Version 1.02, pp. 4–25, 27–28, 51–53, 60–64, (Mar. 15, 1994).
Plug and Play BIOS Specification, Version 1.0A, pp. 4–27, 38–46, (Mar. 10, 1994).

*Primary Examiner*—Meng-Ai An
*Attorney, Agent, or Firm*—Pravel, Hewitt, Kimball & Krieger

[57] ABSTRACT

A circuit for configuring a Plug and Play expansion card in one of three ways. The first is the standard Plug and Play configuration method, wherein expansion cards go through the isolation process to obtain unique Card Select Numbers (CSN). This method requires the existence of a dedicated serial EEPROM to store the system resource data for the expansion cards. However, when an expansion card is directly mounted onto a system board, it becomes a system board device. This allows the separate serial EEPROM to be removed. To implement, two alternative configuration modes are provided, wherein the expansion card can be configured under main CPU control. In these alternative modes, the configuration data is stored in the main system BIOS ROM. In the first mode, a register in the expansion card is mapped to a fixed ISA I/O address. In the second mode, the register is controlled by a dedicated pin, thus allowing it to be mapped to any ISA I/O address. To determine which configuration mode is used by the expansion card, pullup or pulldown resistors are connected to certain expansion card output pins. A second embodiment is also described wherein a static random access memory (SRAM) is utilized to store the serial identifier and the resource data. In this embodiment, the system BIOS initially writes the serial identifier and resource data into the SRAM. After this is done, a Plug and Play configuration process is invoked, in which the serial identifier is retrieved from the SRAM rather than the serial EEPROM.

22 Claims, 13 Drawing Sheets

EXPANSION DEVICE CONFIGURATION SYSTEM HAVING TWO CONFIGURATION MODES WHICH USES AUTOMATIC EXPANSION CONFIGURATION SEQUENCE DURING FIRST MODE AND CONFIGURES THE DEVICE INDIVIDUALLY DURING SECOND MODE

BACKGROUND OF THE INVENTION

1. Field of the Invention

The invention relates to the configuration of expansion devices, and more particularly, to a technique of configuring the expansion devices without the need for a separate storage device.

2. Description of the Related Art

The most popular expansion bus standard in the PC industry today is the Industry Standard Architecture (ISA). The ISA bus was first used in the PC/AT line of personal computers by International Business Machines Corporation (IBM). As a result of the immense popularity of ISA, a large number (thousands) of expansion cards and peripherals are available for ISA compatible personal computers. The ISA bus requires the allocation of memory and I/O address spaces, DMA channels and interrupt levels among multiple ISA expansion cards. However, ISA does not define a hardware or software mechanism for allocating these resources. Consequently, configuration of ISA cards is typically done with switches or jumpers that change the decode maps for memory and I/O space and steer the DMA and interrupt signals to different pins on the bus. In addition, system configuration files need to be updated to reflect the configuration changes. When more than one expansion card is placed onto an ISA bus, conflicts may arise as a result of the different resource requirements of the expansion cards. To address these potential conflicts, users had to refer to documentation provided by the expansion card manufactures. For the user, this configuration process was both time consuming and unreliable.

In a joint effort between Compaq Corporation, Intel Corporation, Microsoft Corporation and Phoenix Technologies Ltd., the Plug and Play standard was developed. The Plug and Play specification allows for the automatic configuration of Plug and Play expansion cards. Any conflict that may exist between different Plug and Play cards is automatically resolved by the system. In systems where both Plug and Play expansion cards and standard ISA cards are connected, the configuration needs to be augmented in the system BIOS and/or operating system to manage and arbitrate ISA bus resources.

The two key functions performed by the Plug and Play system BIOS are resource management and runtime configuration. The basic system resources, which include the DMA channels, interrupt request lines, and I/O and memory addresses, are allocated by the Plug and Play system BIOS in its resource management mode. Because there are thousands of expansion cards available, these system resources are commonly allocated in a conflicting manner in ISA systems, which can lead to bootstrap and system configuration failures. In its role as resource manager, the Plug and Play system BIOS configures the Plug and Play expansion cards before or during the Power On Self Test (POST) procedure. The main system board and other standard ISA cards are configured during the POST procedure. It is noted that the Plug and Play system BIOS performs the same POST requirements of existing ISA computer systems. During the Plug and Play configuration phase, the Plug and Play expansion cards provide their resource requirements to allow the system BIOS to perform resource allocation and conflict resolution. After the configuration procedure is complete, POST is executed. After the POST procedure is completed, control is transferred from the system BIOS to the operating system software. However, in its runtime configuration mode, the system BIOS does provide configuration services for system board devices after the POST procedure has finished. This feature allows the system BIOS to dynamically change the resources allocated to system board devices after the operating system has been loaded thereby allow the operating system software to manipulate the configuration of the system board devices.

A more detailed description of the procedure for configuring Plug and Play ISA expansion cards would be clearer when discussed in conjunction with FIGS. 1 and 2. Referring now to FIG. 1, the configuration steps executed by the Plug and Play system BIOS for Plug and Play expansion cards are shown. Upon power-up, all Plug and Play expansion cards detect a signal RESET_DRV, which is asserted by a reset controller in the computer system during power-up to cause a hardware reset of the ISA expansion boards. Upon detection of the asserted signal RESET_DRV, the Plug and Play expansion cards set their card select number (CSN) to the value 0, and enter into a WAIT FOR KEY state. The commands asserted by the system BIOS to the Plug and Play expansion cards are provided through three 8-bit I/O ports: an ADDRESS port, a WRITE_DATA port and a READ_DATA port. The expansion cards in the WAIT FOR KEY state do not respond to any access to their ports until an initiation key is detected. The initiation key is defined by a series of writes to the ADDRESS port of each expansion card. In step 100, if the proper series of I/O writes performed by the system BIOS is decoded, then the Plug and Play expansion cards enter into a configuration mode. Once in configuration mode, the cards enter into a SLEEP state. Proceeding now to step 104, a command WAKE[CSN] is asserted with the value of CSN equal to 0. This causes the expansion cards to transition from the SLEEP state to an ISOLATION state, and to initialize a serial identifier/resource data pointer. Because all of the expansion cards respond to the same I/O port addresses, a unique number provided on each card is used to distinguish the Plug and Play expansion cards. This unique number is also referred to as the serial identifier, which is a 72-bit number composed of two 32-bit fields and an 8-bit checksum. The first 32-bit field is typically the vendor identifier, while the second 32-bit field can be any value, such as the card serial number, as long as the first and second 32-bit fields represent a number that is unique to that expansion card. The 8-bit checksum is used to ensure that no conflicts have occurred while reading the device identifier information. Each expansion card writes its serial identifier into a serial isolation register, whose contents are outputted one bit at a time. After the expansion card has been properly placed into the ISOLATION state, control proceeds to step 106, where the expansion cards are isolated in an isolation process. Step 106 is shown in more detail in FIG. 2.

Referring now to FIG. 2, a flow diagram of the Plug and Play ISA expansion card isolation is shown. Each expansion card expects 72 pairs of I/O read accesses to the READ_DATA port. Each expansion card responds to these reads depending on the value of each bit of the 72-bit serial identifier, which is serially outputted one bit at a time, starting at the least significant bit of the serial identifier. In step 200, the first bit is obtained from the serial isolation register. Next, in step 202, it is determined if the current bit of the serial identifier is a 1. If so, the expansion card writes the value 0×55 onto a data bus SD[7:0] in step 204. It is noted that more than one expansion card can drive the data bus SD[7:0] with the value 0×55 at the same time. If the current bit of the serial identifier is a 0, then control proceeds to step 206, where the expansion card(s) tristate the output drivers connected to data bus SD[7:0]. For those expansion cards whose current serial identifier bit is 0, control next proceeds from step 206 to step 208, where the expansion card(s) determine if the data bus SD[1:0] is equal to the binary value 01. If so, that would indicate that at least one other expansion card on the ISA bus is driving the value 0×55 onto the data bus D[7:0]. Control stays in step 208 until a second I/O read is performed to the same location in the serial isolation register. Thus, for each bit in the serial isolation register, two reads are performed on that bit. Each of these two reads is referred to as a phase of the isolation register read cycle during the isolation process. When the second read occurs, control proceeds from step 208 to step 212 for those expansion card(s) where the current serial identifier bit is equal to zero. If in step 208 it is determined that the data bus SD[1:0] is not equal to the binary value 01, then control proceeds to step 214 when the second I/O read occurs. For these particular expansion cards, their output drivers remain tristated. For the expansion card(s) whose current serial identifier bit is a 1, control proceeds from step 204 to step 210 when the second I/O read occurs. In step 210, the expansion card(s) that drove the value 0×55 onto the data bus SD[7:0] in step 204 now drive the value 0×AA onto the data bus SD[7:0]. In step 212, the expansion card(s) with the tristated data outputs determines if the data bus SD[1:0] contains the binary value 10. If so, control proceeds to step 216. This indicates that at least one other expansion card contains the value 1 in the current bit of its serial identifier, and thus has driven the data values 0×55 and 0×AA onto the data bus SD[7:0] in the first and second I/O read cycles, respectively. Therefore, the expansion card(s) that contain the value 0 in the current bit of its serial identifier "loses out" in the current iteration of card isolation process. These cards are put into the SLEEP state in step 216, and will participate only in future iterations of the isolation process. The expansion cards that are placed into the SLEEP state in step 216 are not activated until the command WAKE[0] is asserted again.

In step 212, if it is determined that the data bus SD[1:0] is not equal to the binary value 10, which indicates that no other expansion card is driving the value 0×AA onto the data bus SD[7:0], then control proceeds to step 214. In step 214 it is determined if all 72 bits of the serial identifier have been read. If not, control proceeds from step 214 to step 218, where the next serial identifier bit in each of the expansion cards is fetched. Control proceeds from step 218 back to step 202, where the isolation process is repeated. If in step 214, it is determined that all 72 bits of the serial identifier has been read, which indicates that an expansion card has been isolated, control then returns back to the configuration routine. At this time, only one expansion card should still be active as CSN[0]. All other expansion cards will be in sleep state or will have a different CSN value.

Returning now to FIG. 1, control proceeds from step 106 to step 108, where the isolated expansion card is assigned a unique handle, which is also referred to as the card select number (CSN). The CSN is later used to select the expansion card. Expansion cards that have been assigned a non-zero CSN value will not participate in subsequent iterations of the isolation process in step 106. Once an expansion card is assigned a non-zero CSN value, it can respond to other bus commands. After the CSN is assigned for the expansion card, control proceeds from step 108 to 110, where the system BIOS performs resource data read cycles on the isolated expansion card. The resource data describes all the resource requirements of the Plug and Play ISA expansion card. The resource data includes such items as the Plug and Play version number, the number of logical devices (that is, the number of functions available on the Plug and Play expansion card), the logical device ID, compatible device ID, IRQ format, DMA format, I/O port descriptor, fixed location I/O port descriptor, memory range descriptor, identifier string and various other information. The resource data, along with the serial identifier described earlier in step 106, are conventionally stored in a serial EEPROM, which is typically 2K bits in size. The expansion card resource data is initially read into a resource data register located on the expansion card. After 8 bits have been loaded into the resource data register, a status flag on the expansion card is set indicating that the next byte of resource data is ready to be outputted. Thus, the system BIOS will read the resource data one byte at a time from the resource data register. This process is repeated until all the resource data has been read, in which case, control proceeds to step 112, where it is determined if all the Plug and Play expansion cards have been accessed. If not, control returns to step 104, where the configuration routine is reiterated. If all the cards have been accessed, then control proceeds to step 114.

In step 114, the system resources are assigned to each expansion card. For those expansion cards with more than one logical device, each logical device is assigned resources separately. Configuration registers are located on each expansion card for configuring the card's standard ISA resource usage for each logical device. To program the configuration registers, the system BIOS sends a command WAKE[CSN], along with write data to set the desired CSN. The selected expansion card enters into a CONFIG state, and all other expansion cards are forced into a SLEEP state. Next, a logical device number is written to the logical device number register to select the device that is to be programmed. After the proper logical device is selected, the configuration registers are written with the proper configuration values. Thus, memory configuration, I/O space configuration, interrupt request level configuration and DMA channel configuration are performed for each logical device. After the system resources for a logical device are assigned, the logical device is activated on the ISA bus. After all the configuration registers on an expansion card are programmed, the expansion card is placed into the WAIT FOR KEY state. Thus, if it is desired at a later time to access the Plug and Play configuration registers, the initiation key can be issued by the system BIOS to access the desired expansion card. It is noted that the Plug and Play registers can be reprogrammed even in the operating system environment. This is desirable for docking stations, as well as for computer systems that support hot insertion capability and power management. After all the expansion cards have been configured and all the logical devices have been activated, the system BIOS exits the Plug and Play configuration routine, and the standard POST procedure is executed.

The preceding describes the general steps in which Plug and Play ISA expansion cards are configured. Depending upon the type of computer system, the configuration algorithm may be different. For a more complete description of Plug and Play ISA systems, refer to Plug and Play ISA Specification (1994), Intel Corporation and Microsoft Corporation; and Plug and Play BIOS Specification (1993), Compaq Computer Corporation, Phoenix Technologies Ltd. and Intel Corporation. Both specifications are hereby incorporated by reference.

Generally, when the Plug and Play expansion cards are connected to the ISA bus, the serial EEPROM for storage of the serial identifier and Plug and Play resource data is required. However, in certain cases, the functions and logic of the expansion card may be located on the system board of the computer. In this location, the system BIOS, which is specific to the system board, will know that the functions are present. However, for full compatibility with Plug and Play, a serial EEPROM will still be required to conform to the Plug and Play protocol. This serial EEPROM adds cost to the system and appears unnecessary as the system BIOS or other storage device could readily contain the serial identifier and resource data needed for Plug and Play compatibility. But the serial EEPROM has nonetheless been considered necessary for Plug and Play compatibility, increasing system cost. Removal of the serial EEPROM is thus desirable while retaining Plug and Play compatibility.

SUMMARY OF THE PRESENT INVENTION

According to the present invention, an apparatus and method is developed that avoids the need for a separate configuration storage device for Plug and Play expansion cards. The apparatus includes the standard Plug and Play capabilities to allow for standard Plug and Play configuration. However, an indicating means is provided as part of the apparatus to allow for an alternative configuration method. In the preferred embodiment of the present invention, two embodiments of two alternative configuration modes are provided. In both alternative modes of the first embodiment, the standard Plug and Play isolation process is initially ignored and the expansion cards do not receive card select numbers (CSN). In the first alternative configuration mode, a dedicated register is mapped to a fixed ISA I/O address. This register is used to enable or disable the standard Plug and Play configuration registers on the expansion card. Thus the configuration data for the expansion card can be written under system CPU control to the configuration registers. In the second alternative configuration mode in the first embodiment, a pin on the expansion card is used as a chip select input for the dedicated register. In this second mode, the register is not mapped to a fixed address, but may be mapped to any location by other system board hardware.

In the second embodiment, the dedicated register is selected in the same manner as the first embodiment, but instead of directly loading the configuration data, the serial identifier and resource data are loaded into a small RAM area when the dedicated register is enabled. When the dedicated register is disabled, this small RAM area is used to provide the serial identifier and configuration data to the Plug and Play logic instead of the serial EEPROM. This second embodiment allows configuration according to full Plug and Play convention, while the first embodiment has the expansion functions determined and written outside of the Plug and Play software.

Preferably, pullup and pulldown resistors are used to indicate whether the standard Plug and Play configuration mode or one of the alternative configuration modes is utilized by the expansion card.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 3:
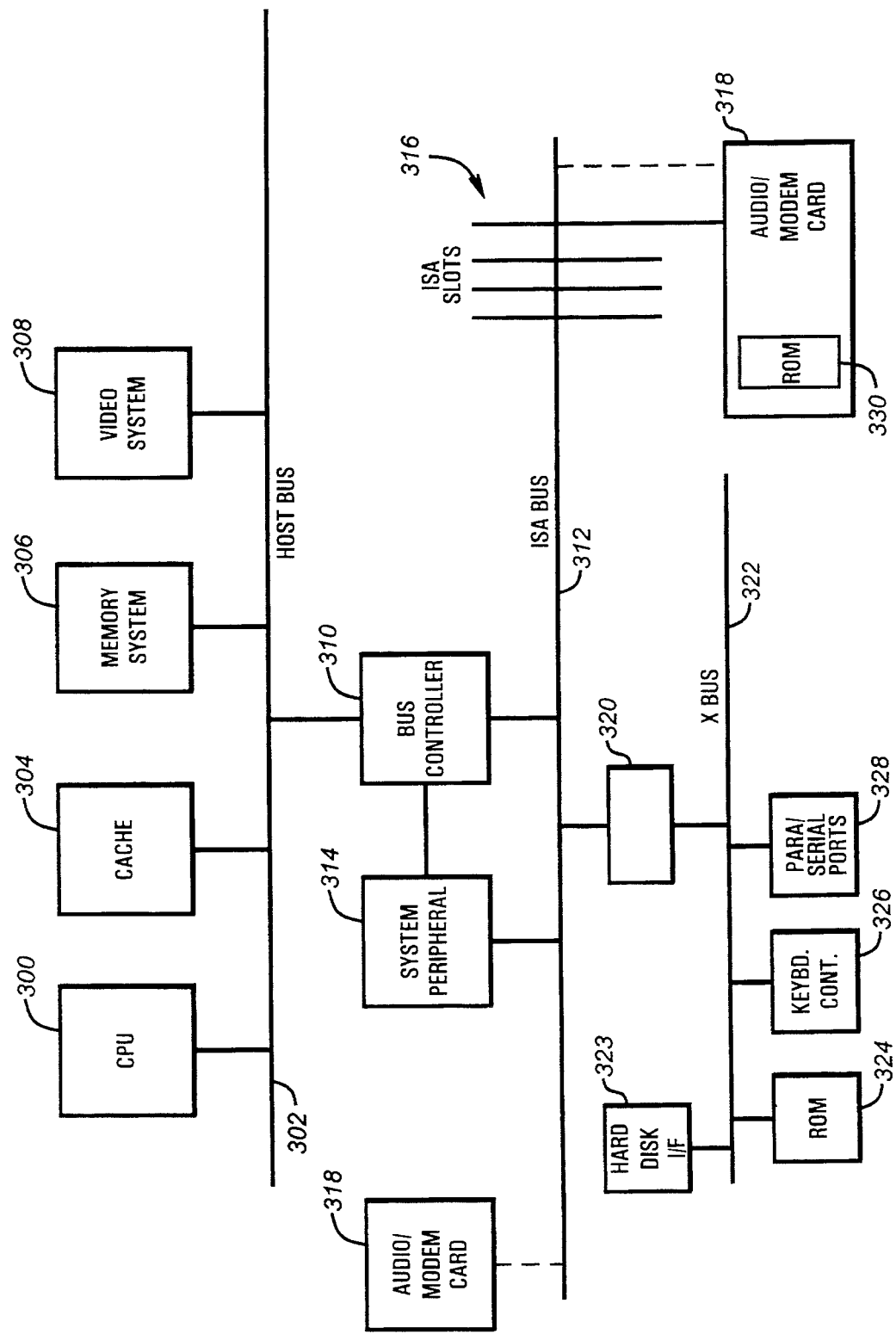
FIG. 3 is an exemplary computer system incorporating the preferred embodiment of the present invention.

Referring now to FIG. 3, a computer system S incorporating a device according to the present invention is shown. The computer system S includes a host CPU or processor 300, which is conventionally a microprocessor such as a 486 or Pentium from Intel Corporation. A host bus 302 is connected to the CPU 300 to act as a first bus in the computer system S. A cache unit 304 is connected to the host bus 302 to cache memory operations of the CPU 300. A main memory system 306 is also connected to the host bus 302 to act as the main memory of the computer system S. A video system 308 is further connected to the host bus 302 to allow high performance operation of the video system 308.

A bus controller 310 is connected between the host bus 302 and an ISA or Industry Standard Architecture bus 312. A system peripheral 314 is connected to the bus controller 310 and the ISA bus 312. The system peripheral 314 includes certain common peripheral devices used in the computer system S such as timers, an interrupt controller and, of importance to this particular application, a DMA controller as conventional in IBM PC compatible computers. A number of ISA slots 316 for receiving interchangeable circuit cards are present on the ISA bus 312. In a conventional embodiment an audio/modem card 318 according to the Plug and Play specification would be located in one of the ISA slots 316. In the preferred embodiment, the audio/modem card 318 is directly mounted onto the system board and connected directly to the ISA bus 312, or alternatively to the X bus 322. When directly mounted, the audio/modem card 318 would be considered as a system board device rather than an expansion device. When the audio/modem card 318 is connected to the ISA slots 316, a separate serial EEPROM 330 conventionally is required to store the audio/modem card's configuration data. In accordance with the Plug and Play specification, the audio/modem card 318 requires no configuration switches or jumpers. In accordance with the present invention, no separate configuration ROM is required when the audio/modem card 318 is directly mounted on the system board. The configuration data for the audio/modem card 318 is stored in another storage device available in the computer system, such as the system BIOS ROM 324 or on the system hard disk drive.

Appropriate buffer and transceiver logic 320 is connected between the ISA bus 312 and an X bus 322, which forms an additional input/output (I/O) bus in the computer system S. A read only memory or ROM 324, which contains the instructions forming the BIOS and other fundamental operations, is connected to the X bus 322. A keyboard controller 326 is connected to the X bus 322 to receive keyboard and pointing device inputs from a user. Parallel and serial 328 ports as are conventional are connected to the X bus 322 to provide certain I/O capabilities. A hard disk interface 323 is connected to the X bus 322 to allow use of a hard disk drive.

FIG. 3 illustrates an exemplary computer system and it is understood that other conventional computer systems having different architectures could be utilized and that the computer system S of FIG. 3 has been shown only for a representative embodiment to place the preferred embodiment of the invention in context. It is also understood that the audio/modem card 318 is merely an exemplary Plug and Play expansion card, and that other Plug and Play cards can incorporate the present invention.

Figure 4:
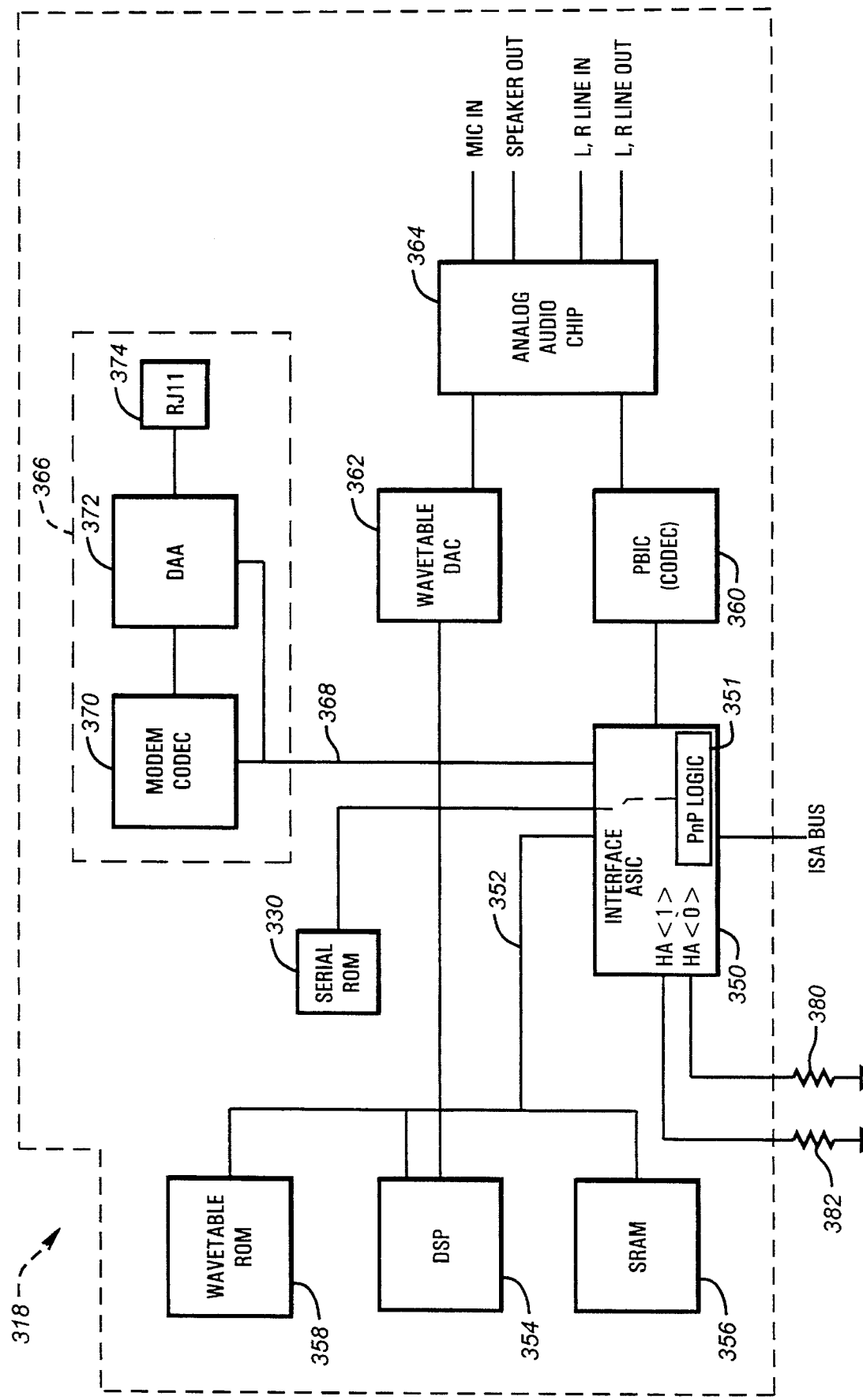
FIG. 4 is a block diagram of a Plug and Play device according to the present invention.

Referring now to FIG. 4, the audio/modem card 318 is shown in more detail. An interface application specific integrated circuit (ASIC) 350 forms the core of the audio/modem card 318. A DSP bus 352 is provided from the interface ASIC 350 and is connected to a DSP or digital signal processing computer 354, static random access memory or SRAM 356 which is utilized by the DSP 354 and, in the preferred embodiment, a wavetable ROM 358. The wavetable ROM 358 contains certain wavetable information used in audio output situations. The DSP 354 is preferably one of the many high performance DSPs available and, in the preferred embodiment, is the Motorola 56002. This DSP 354 is a 24-bit unit and can access 64K words of memory in several different address spaces. The interface ASIC 350 is further connected to an audio codec 360 referred to as the PBIC. Preferably the audio codec 360 is the AD1848 device made by Analog Devices. The DSP 354 is connected to a wavetable DAC or digital to analog converter 362. The wavetable DAC 362 takes the wavetable data from a wavetable ROM 358, as processed by the DSP 354, and converts it to an analog audio signal. The outputs of the audio codec 360 and the wavetable DAC 362 are provided to an analog audio chip 364, which contains amplifiers and mixing circuits. The analog audio chip 364 includes a microphone input, a speaker output and left and right line level inputs and outputs as conventional in audio systems.

The interface ASIC 350 includes a block referred to as the Plug and Play logic 351. The Plug and Play logic 351 provides the necessary logic to allow switchless configuration of the audio/modem card 318. The Plug and Play logic 351 is connected to the serial EEPROM 330 if utilized in separate card mode to fully conform with the Plug and Play specification. In the preferred embodiments, the Plug and Play logic 351 also incorporates circuitry for use when a serial EEPROM 330 is not provided. The Plug and Play logic 351 is generally shown in the remaining figures and described below.

The interface ASIC 350 is connected to two pullup or pulldown resistors 380 and 382 through specified output pins. The resistors 380 and 382 are either tied high or low, depending upon which configuration mode is being utilized. When both resistors 380 and 382 are tied low, the standard Plug and Play configuration mode is selected. If the resistor 380 is tied high and the resistor 382 is pulled low, the first alternative configuration mode is chosen. If the resistor 380 is pulled low and the resistor 382 is tied high, the second alternative configuration mode is selected. The resistors 380 and 382 are preferably connected to output pins HA[0:1], respectively, on the audio/modem card 318. The pins HA[0:1] are the two least significant DSP host interface address bus pins, which are used to select the register address in the DSP's host interface during accesses to those registers. The pins HA[0:1] are tristated during power up reset to allow the states defined by the resistors 380 and 382 to be detected.

Figure 5:
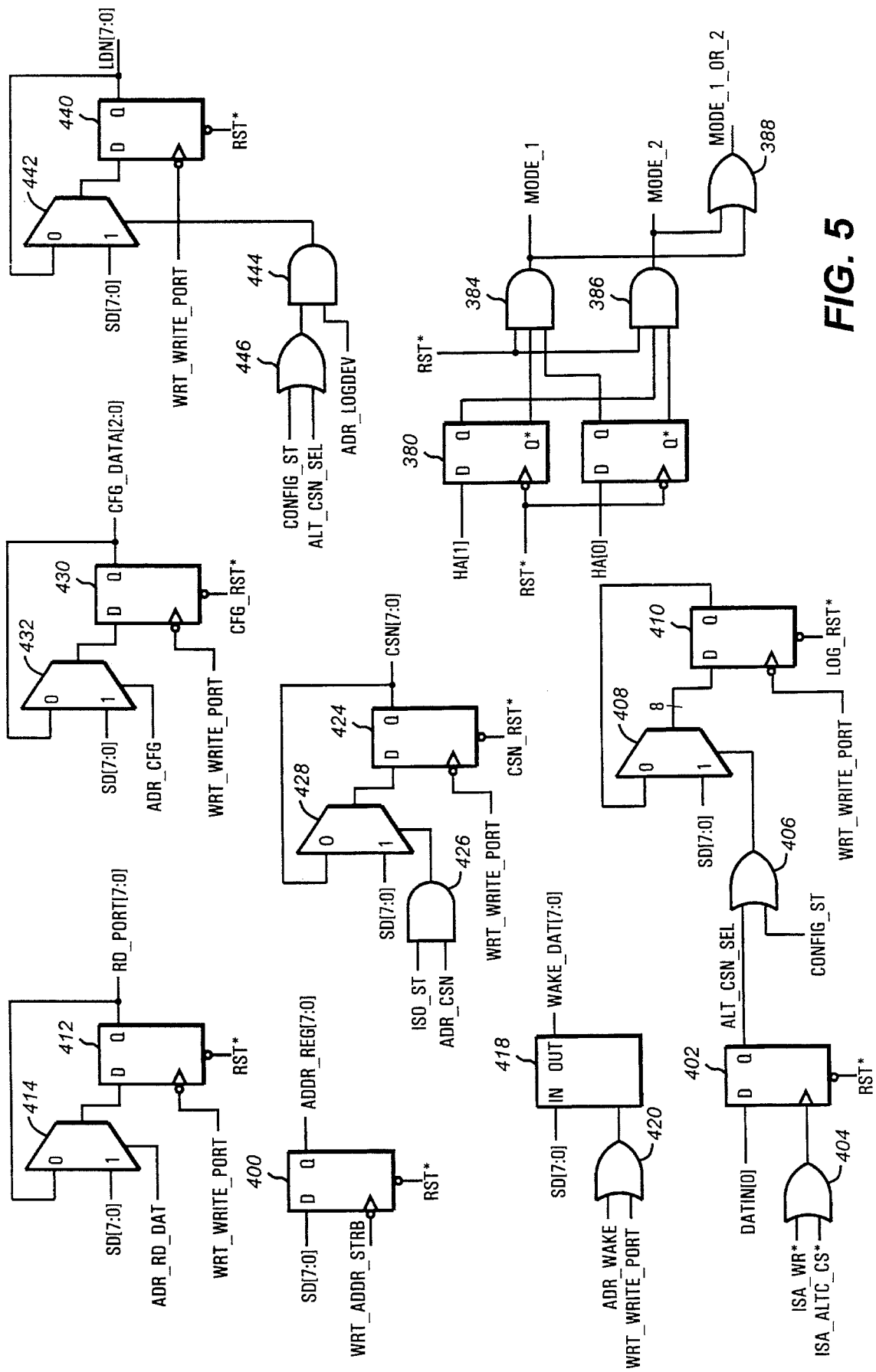
FIG. 5 shows a portion of the device of FIG. 4 that supports the configuration of the device.

This state determination is shown in FIG. 5. The signal HA[1] is provided to the D input of a D-type latch 380. The latch is gated by the signal RST*, the reset signal in the computer system S. The signal HA[0] is provided to the D input of a D-type latch 382, which is also gated by the signal RST*. The noninverted output of the latch 382 and the inverted output of the latch 380 are two inputs to an AND gate 384, whose output is the signal MODE_1 or first mode signal. The third input to the AND gate 384 is the signal RST*. The non-inverted output of the latch 380, the inverted output of the latch 382 and the signal RST* are the inputs of an AND gate 386, whose output is the signal MODE_2 or second mode signal. The signals MODE_1 and MODE_2 are provided to an OR gate 388 to develop a signal MODE_1_OR_2.

A modem daughterboard 366 is connected to the interface ASIC 350 over a bus 368 having serial and parallel data transfer portions. A modem codec 370 is located on the daughterboard 366 and receives the bus 368 from the interface ASIC 350. A data access arrangement or DAA 372 is connected to the modem codec 370 and the interface ASIC 350. A telephone jack 374 is connected to the DAA 372 to provide an interface to the telephone system. Alternatively, the daughterboard 366 could contain other standard telephony interfaces, such as ISDN, or a high speed serial link for PBX or general purpose applications. The provision of the daughterboard 366 in conjunction with the DSP 354 allows low cost addition of modem functions, as indicated in copending application Ser. No. 08/094,491, entitled "Apparatus for Adding Modem Capabilities to a Computer System Equipped with a Digital Signal Processor," filed Jul. 19, 1993, and its continuation application Ser. No. 08/404,942, filed Mar. 15, 1995, pending, each of which is hereby incorporated by reference.

Referring again to FIG. 5, portions of the Plug and Play logic 351 are shown. The audio/modem card 318 includes three Plug and Play ports; an ADDRESS port, a WRITE_DATA port and a READ_DATA port. The ADDRESS and WRITE_DATA ports are located at predetermined ISA addresses, while the READ_DATA port is programmable between a range of ISA addresses. The address provided to an address port is latched into a register 400 on the falling edge of a strobe WRT_ADDR_STRB. The signal WRT_ADDR_STRB is asserted high when the address port is accessed with the proper ISA address, the ISA write strobe IOWC* is asserted low, and the audio/modem card 318 is not in a WAIT FOR KEY state or a signal ALT_CSN_SEL is asserted high. As described above, the WAIT FOR KEY state is a state in which a Plug and Play expansion card waits for an initiation key, ignoring all other accesses. The signal ALT_CSN_SEL is asserted when the audio/modem card 318 board is in one of two alternative configuration modes. In the first embodiment, when the signal ALT_CSN_SEL is asserted high, the ISA isolation process is ignored and the audio/modem card 318 does not receive a card select number (CSN) as required in a standard Plug and Play configuration. Instead, in the first alternative configuration mode, an alternative configuration register 402 on the audio/modem card 318 is assigned to a fixed ISA I/O address. In the first mode, all configuration information is written under the system CPU control through the standard Plug and Play configuration registers. In a second alternative configuration mode, a configuration select pin on the interface ASIC 350 is used as an active low chip select input for an alternative configuration register 402. Thus, in the second alternative configuration mode the register 402 is not assigned to the predefined ISA address in the first mode, but the register 402 can be mapped to any location by the system board hardware. A second embodiment using the signal ALT_CSN_SEL to enable the configuration is described below in conjunction with FIG. 12.

The alternative configuration register 402 is clocked by the output of an OR gate 404. The inputs of the OR gate 404 are connected to signals ISA_WR* and ISA_ALTC_CS*. The signal ISA_WR* is a general write strobe provided by other logic on the interface ASIC 350. The signal ISA_ALTC_CS* is asserted high if the audio/modem card 318 is in the first configuration mode and the proper predefined ISA address is asserted or if the card 318 is in the second configuration mode, the configuration select pin is driven low. The D input of the register 402 is connected to a signal DATIN[0], which is the least significant bit of the data bus that is multiplexed between the SRAM bus 352 and the ISA bus 312. The output of the D flip-flop 402 is the ALT_CSN_SEL signal and is connected to an input of an OR gate 406. The other input of the OR gate 406 is connected to a signal CONFIG_ST, which when asserted high indicates that the audio/modem card 318 is in the CONFIG mode. The output of the OR gate 406 is connected to the select input of a multiplexor 408. The multiplexor 408 provides data to be latched into configuration registers, which are represented by a block 410. The configuration registers 410 are loaded on the falling edge of a signal WRT_WRITE_PORT, which is asserted when the WRITE_DATA port is accessed, the ISA write strobe IOWC* is asserted low, and the card 318 is not in a WAIT FOR KEY state or the signal ALT_CSN_SEL is asserted high. As there are a number of logical devices on the audio/modem card 318, independent configuration registers must be dedicated to each logical device. Signals LDN[7:0] are provided to identify the appropriate set of configuration registers 410. In the preferred embodiment, the audio/modem card 318 is divided into 8 logical devices. The actual configuration register of the particular logical device is provided by the value in the address register 400. When the select input of the multiplexor 408 is asserted high, data is provided to the configuration registers 410 through the ISA data bus SD[7:0]. Otherwise the outputs of the configuration registers 410 are provided to their inputs through the I0 input of the multiplexor 408, and the state of the configuration registers 410 is not changed. The configuration registers 410 are reset to their initial conditions on the falling edge of a signal LOG_RST*, which is asserted low when the system reset signal RST* is low or bit 0 of a configuration control register 430 is written with a 1.

Therefore the use of the alternate configuration modes and the ALT_CSN_SEL signal allows bypassing of the Plug and Play configuration process as the configuration registers can be accessed without requiring isolation and configuration according to the Plug and Play specification. This is acceptable as the system BIOS knows that the audio/modem card 318 is present and can include its resource requirements in any configuration process, these resource requirements being stored in the system BIOS or other device such as the hard disk drive. With this process the serial EEPROM 330 is not required for configuration of the audio/modem card 318 when it is installed on the system board.

The 3-bit register 430 stores three configuration control bits. The output of the register 430 is represented by signals CFG_DATA[2:0]. A write to bit 0 of the configuration control register 430 performs a reset of all the logical devices on the audio/modem card 318, as well as the contents of the configuration registers 410 1 CLK cycle later. A write to bit 1 of the configuration control register 430 causes the audio/modem card 318 to enter the WAIT FOR KEY state. A write to the second bit of the register 430 causes the audio/modem card 318 to reset CSN to 0. The input of the register 430 is connected to the output of a 3 bit, two input multiplexor 432. The I0 input of the multiplexor 432 is connected to the signals CFG_DATA[2:0], and the I1 input is connected to the data bus SD[2:0]. The select input of the multiplexor 432 is connected to a signal ADR_CFG, which is asserted high when the contents of the address register 400 contains an address port value corresponding to the configuration control register 430. The register 430 is clocked on the falling edge of a signal WRT_WRITE_PORT and is reset by the falling edge of a signal CFG_RST*. The signal CFG_RST* is asserted low if the system reset signal RST* is asserted. The signal CFG_RST* is also asserted low two clock cycles after the configuration control register 430 is written.

The ISA address for the READ_DATA port is stored in a register 412. The register 412 is clocked by the falling edge of the signal WRT_WRITE_PORT and is reset by the falling edge of a signal RST*. The D input of the register 412 is connected to the output of an eight bit, two input multiplexor 414. The I0 input of the multiplexor 414 is connected to the output of the register 412, which is represented by signals RD_PORT[7:0]. The I1 input of the multiplexor 414 is connected to the data bus SD[7:0], and its select input is connected to a signal ADR_RD_DAT, which is asserted high when the address register 400 contains an address port value corresponding to the read port register 412.

Also located in the interface ASIC 350 is a latch 418, whose data input is connected to the output of a multiplexor 422. Data from the multiplexor 422 is latched whenever the output of an OR gate 420 or the data bus SD[7:0] change state. The inputs of the OR gate 420 are connected to a signal ADR_WAKE and the signal WRT_WRITE_PORT. The signal ADR_WAKE is asserted high when the address register contains an address port value corresponding to the latch 418. The output of the latch 418 provides signals WAKE_DAT[7:0]. The input to the latch 418 is provided by the data bus SD[7:0]. Data is latched into the latch 418 from the data bus SD[7:0] whenever a write to the write port occurs with the address equal to the wake value. A write to the wake data latch 418 causes the audio/modem card 318 to go from the SLEEP state to the ISOLATION state if the data written into the latch 418 is 0 or the CONFIG state if the data written is not 0.

Another register located in the interface ASIC 350 is the CSN register 424. The register 424 is clocked by the falling edge of the signal WRT_WRITE_PORT and is reset on the falling edge of a signal CSN_RST*. The D input of the register 424 is connected to the output of a multiplexor 428.

The I0 input of the multiplexor 428 is connected to the output of the register 424, which is represented by signals CSN[7:0]. The I1 input of the multiplexor 428 is connected to the data bus SD[7:0], and its select input is connected to the output of an AND gate 426. The inputs of the AND gate 426 are connected to a signal ISO_ST and a signal ADR_CSN. When asserted high, the signal ISO_ST indicates that the audio/modem card 318 is in the ISOLATION state. The signal ADR_CSN is asserted high when the address register 400 contains a value corresponding to the CSN register 424. The signal CSN_RST* is asserted low when the system reset signal RST* is asserted or if bit 2 of the configuration control register 430 is written with the value 1.

The signals LDN[7:0] are provided by a logical device number register 440. The register 440 is clocked on the falling edge of the signal WRT_WRITE_PORT and is reset on the falling edge of the system reset signal RST*. The D input of the register 440 is connected to the output of a multiplexor 442. The I0 input of the multiplexor 442 is connected to the signals LDN[7:0], and its I1 input is connected to the data bus SD[7:0]. The select input of the multiplexor 442 is connected to the output of an AND gate 444, whose inputs are connected to the output of an OR gate 446 and to the signal ADR_LOGDEV. The inputs of the OR gate 446 are connected to the signal CONFIG_ST and the signal ALT_CSN_SEL. The signal ADR_LOGDEV is asserted high when the contents of the address register 400 contains an address port value corresponding to the logical device number register 440. Thus, if the audio/modem card 318 is in the configuration state or if an alternative configuration mode is selected, the AND gate 444 outputs a high to the select input of the multiplexor 442. As a result, the contents of the data bus SD[7:0] is latched into the register 440 on the rising edge of the signal WRT_WRITE_PORT.

Figure 6:
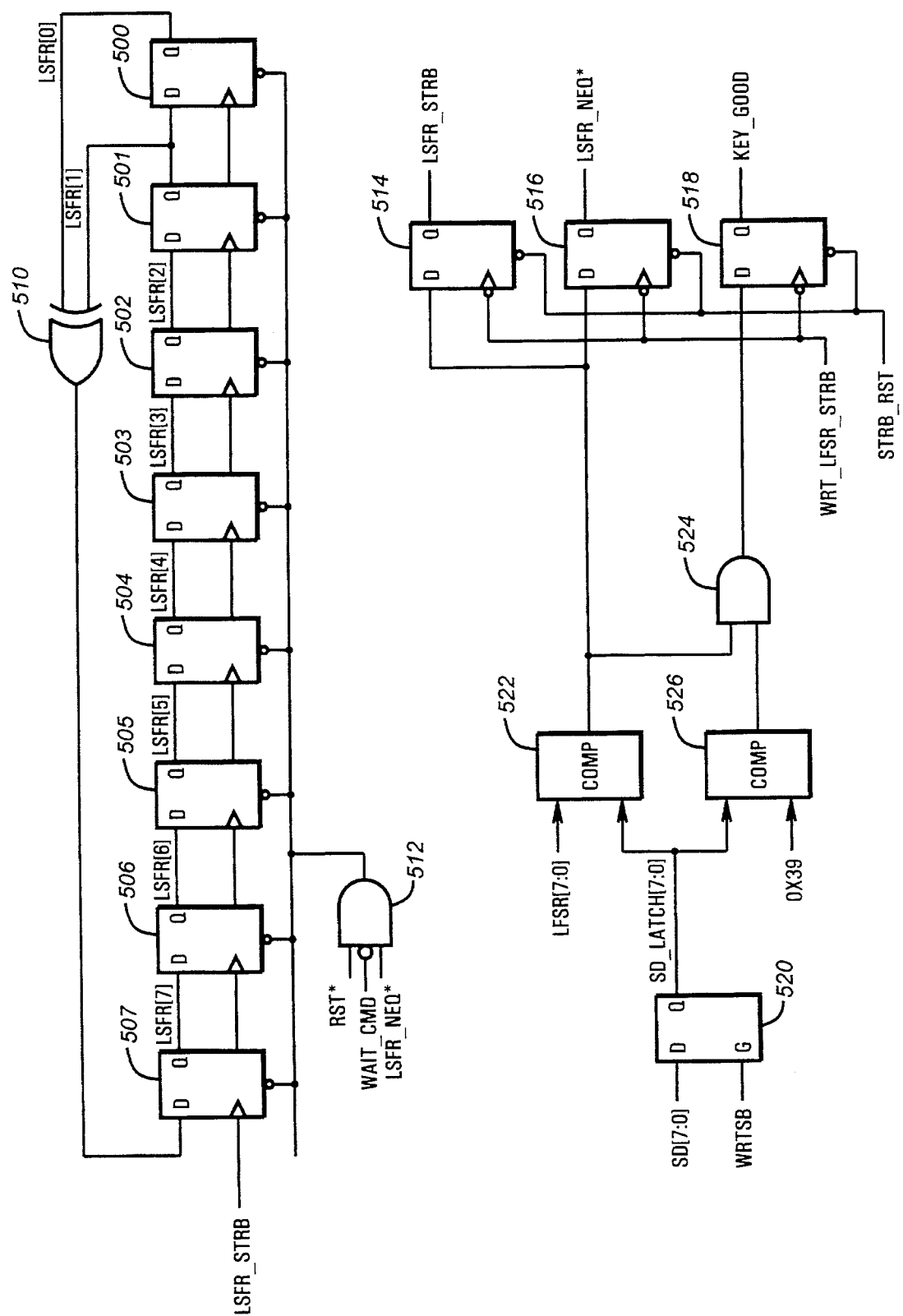
FIG. 6 is a schematic diagram of the initiation key recognition logic.

Referring now to FIG. 6, a circuit is shown that determines whether an initiation key has been provided by the system BIOS. It is assumed that the audio/modem card 318 is set to the standard Plug and Play configuration mode in the ensuing description. The audio/modem card 318 uses a linear feedback shift register (LFSR) to generate data patterns needed to provide an initiation key protocol. The LFSR is built with D flip-flops 500–507, which are clocked by the signal LFSR STRB. The outputs of the D flip-flops 500–507 correspond to signals LFSR[0:7], respectively. On the rising edge of the signal LFSR_STRB, a shift operation is performed, in which the signal LFSR[7] is latched into the D flip-flop 506, the signal LFSR[6] is latched into the D flip-flop 505, the signal LFSR[5] is latched into the D flip-flop 504, the signal LFSR[4] is latched into the D flip-flop 503, the signal LFSR[3] is latched into the D flip-flop 502, the signal LFSR[2] is latched into the D flip-flop 501, the signal LFSR[1] is latched into the D flip-flop 500, and the output of an XOR gate 510 is latched into D flip-flop 507. The inputs of the XOR gate 510 are connected to the signals LFSR[1] and LFSR[0]. The D flip-flops 500–507 are reset to the value 0x6A on the falling edge of the output of an AND gate 512. The inputs of the AND gate 512 are connected to the system reset signal RST*, the inverted state of a signal WAIT_CMD and a signal LFSR_NEQ*. The signal WAIT_CMD is asserted low one clock cycle after bit 1 of the configuration control register 430 is written with the value 1. In the preferred embodiment, the clock signal used is CLK, which is the DSP clock signal. The signal LFSR_STRB is provided by a D flip-flop 514 and the signal LFSR_NEQ* is provided by a D flip-flop 516. Both the D flip-flops 514 and 516 are clocked on the falling edge of a signal WRT_LFSR_STRB, which is asserted when the ADDRESS port and the WRITE_DATA port of the audio/modem card 318 are accessed and the ISA write signal IOWC* is asserted low. The D flip-flops 514 and 516 are reset on the falling edge of a signal STRB_RST*. The signal STRB_RST* is asserted low when the system reset signal RST* is asserted or during the clock cycle after the signal WRT_LFSR_STRB is asserted. A write to the WRT_DATA port, represented by a signal WRSTB being asserted high, causes the contents of the data bus SD[7:0] to be loaded into a data register 520. The data register 520 is gated by the signal WRSTB, which is asserted during the write cycle to the WRT_DATA port. The output signals SD_LATCH[7:0] of the data register 520 are compared by a comparator 522 to the signals LFSR[7:0] provided by the D flip-flops 500–507. If a match occurs, the comparator 522 outputs 1's to the D inputs of the D flip-flops 514 and 516. As a result, on the falling edge of the signal WRT_LFSR_STRB, the signals LFSR_STRB and LFSR_NEQ* are both set high. When the signal LFSR_STRB transitions high, the contents of the D flip-flops 500–507 are shifted in the manner described above. If the value of the signals SD_LATCH[7:0] do not match the value of the signals LFSR_[7:0], the comparator 522 outputs a low state, which causes the signals LFSR_STRB and LFSR_NEQ* to both be set low. When the signal LFSR_NEQ* is set low, the D flip-flops 500–507 are initialized to the initial state of 0x6A. A non-match by the comparator 522 signifies that an improper initiation key has been written to the WRT_DATA port. The output of the comparator 522 is also provided to an input of an AND gate 524. The other input of the AND gate 524 is connected to the output of a comparator 526, which compares the values of the signals SD_LATCH[7:0] to the value 0x39. Thus, if the value of signals LFSR[7:0] is equal to the value 0x39, and the value of the signals SD_LATCH[7:0] is equal to the signals LFSR[7:0], then the comparators 522 and 526 drive their respective outputs high. In this case, the output of the AND gate 524, which is connected to the D input of a D flip-flop 518, is driven high. The D flip-flop 518 is clocked by the signal WRT_LFSR_STRB and reset by the signal STRB_RST*. The output of the D flip-flop 518 is connected to a signal KEY_GOOD. Thus, a match by the comparators 522 and 526 causes the signal KEY_GOOD to be asserted high. The signal KEY_GOOD indicates that the proper initiation key has been written to the WRT_DATA port. In operation, the exact sequence for the initiation key is as follows: 0x6A, 0xB5, 0xDA, 0xED, 0xF6, 0xFB, 0x7D, 0xBE, 0xDF, 0x6F, 0x37, 0x1B, 0x0D, 0x86, 0xC3, 0x61, 0xB0, 0x58, 0x2C, 0x16, 0x8B, 0x45, 0xA2, 0xD1, 0xE8, 0x74, 0x3A, 0x9D, 0xCE, 0xE7, 0x73 and 0x39. If the preceding sequence of data is properly provided to the WRT_DATA port of the audio/modem card 318, the signal KEY_GOOD is set high when the last value 0x39 is received. Any deviation from the exact sequence would cause the D flip-flops 500–507 to be reset to the initial value of 0x6A.

Figure 7:
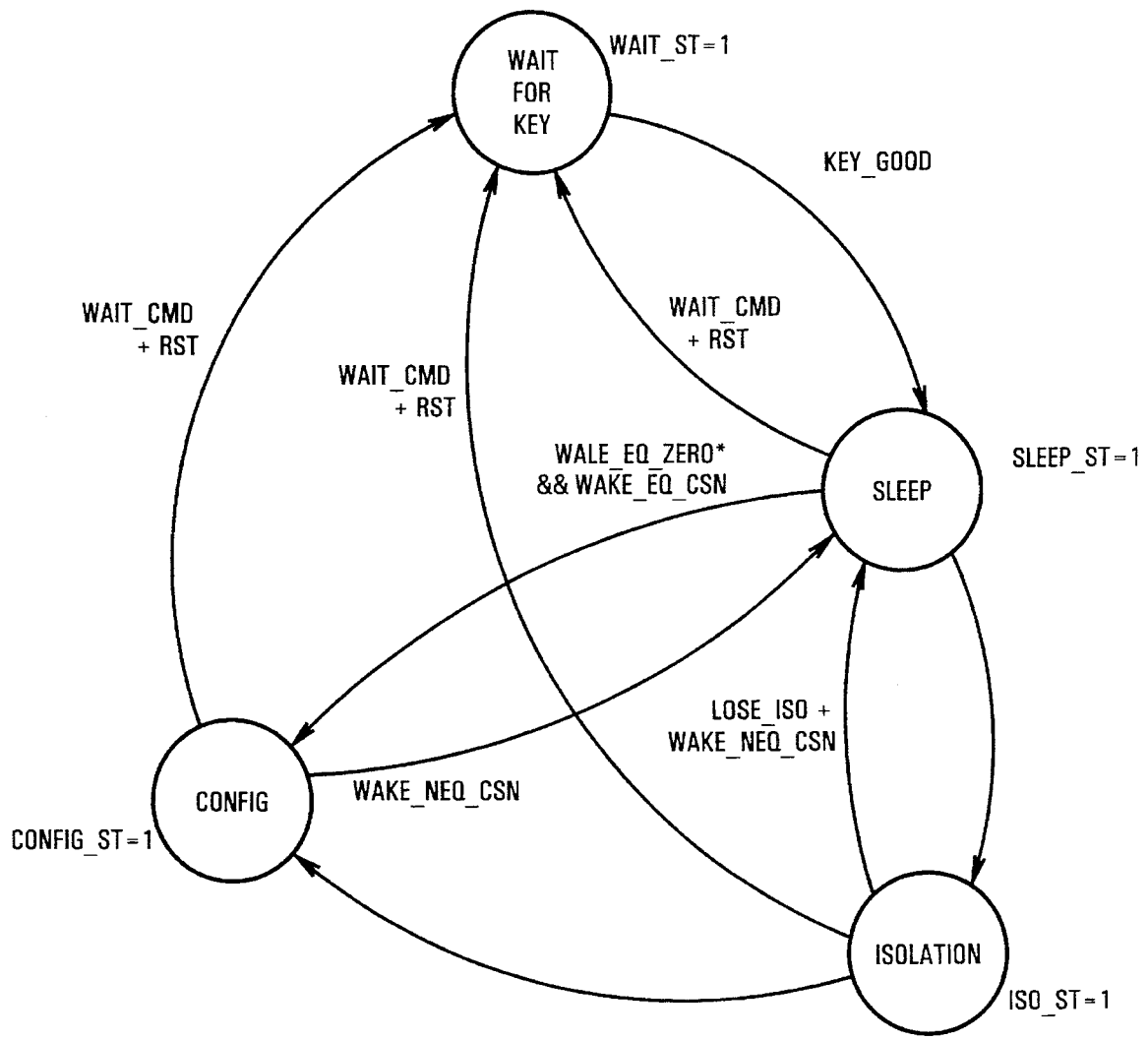
FIG. 7 is a state diagram of the state machine for placing the device of FIG. 4 in the appropriate state.

Referring now to FIG. 7, a state diagram is shown of a state machine located in the interface ASIC 350 that determines the state of the expansion card. On the falling edge of the system reset signal RST*, the state machine enters into a WAIT FOR KEY state. In response to the reset signal RST* being asserted low, the CSN is reset to the value zero. The WAIT FOR KEY state is represented by a signal WAIT_ST being asserted high. If the proper initiation key is provided to the expansion card, the signal KEY_GOOD is asserted high, causing the state machine to transition from the WAIT FOR KEY state to the SLEEP state, which is represented by a signal SLEEP_ST being asserted high.

Figure 8:
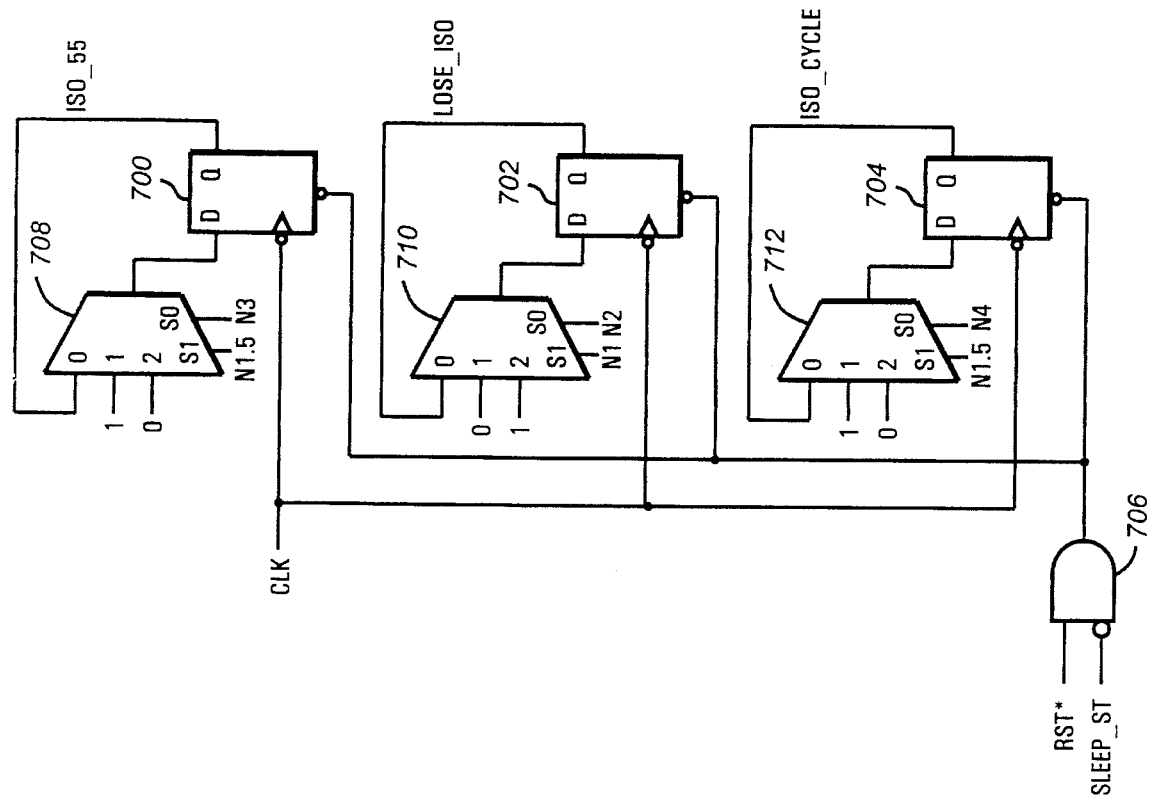
FIG. 8 shows the logic for determining whether the device of FIG. 4 has "lost out" in the current isolation process.
Figure 8:
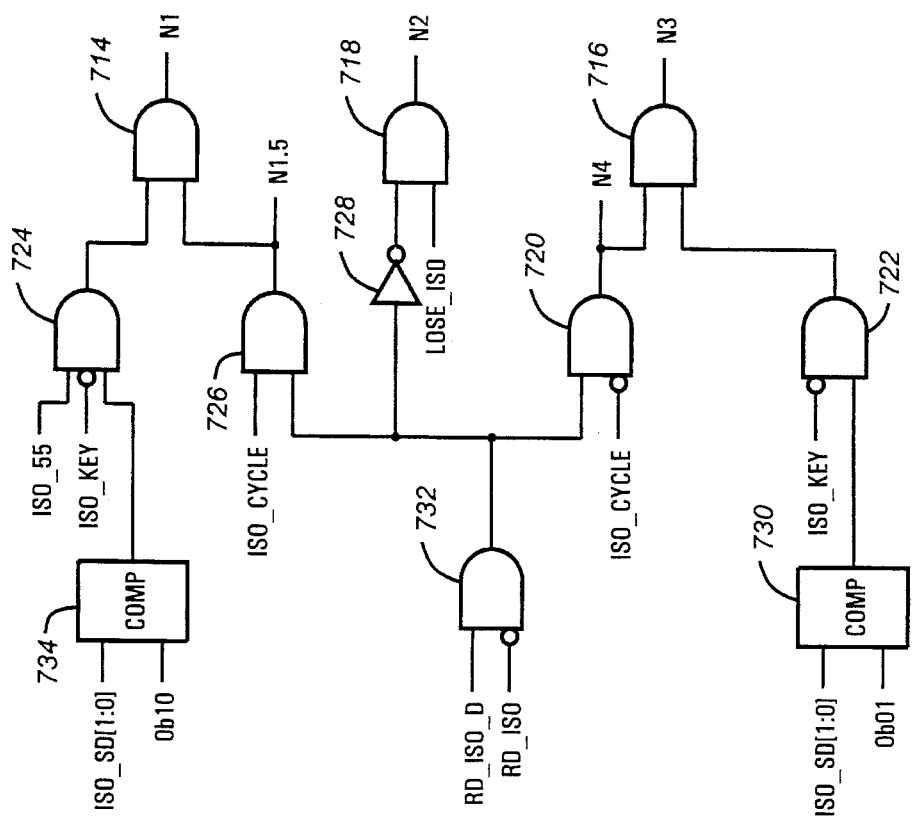

Once the state machine enters into the SLEEP state, the signal WAIT_CMD asserted high causes the state machine to transition from the SLEEP state back to the WAIT FOR KEY state. The signal WAIT_CMD represents the WAIT FOR KEY command, and is asserted high when a 1 is written to bit 1 of the configuration control register. From the SLEEP state, the state machine transitions to the ISOLATION state when both signals WAKE_EQ_ZERO and CSN_EQ_ZERO are high. The signal CSN_EQ_ZERO is asserted high when the CSN register 424 contains the value 0. The signal WAKE_EQ_ZERO is asserted high when the wake data latch 418 is written with a value 0. The ISOLATION state is represented by a signal ISO_ST being asserted high. Once the expansion cards are placed into the ISOLATION state, an isolation process is run by the system BIOS to isolate the expansion cards inserted into the ISA slots 316, so that a chip select number (CSN) can be assigned to each individual expansion card. The logic on the expansion cards that are involved in the isolation routine is shown in FIG. 8, which will be described in greater detail. If the WAIT FOR KEY command WAIT_CMD is issued when the state machine is in the ISOLATION state, control returns to the WAIT FOR KEY state. Otherwise, each expansion card stays in the isolation state until one of the expansion cards is isolated by the isolation process. Once an expansion card has been isolated, it is assigned a unique CSN by writing the CSN register 424. A write to the CSN register 424 causes a signal CSN_SET to be asserted high, which in turn causes the state machine on the isolated expansion card to transition from the ISOLATION state to the CONFIG state. However, on the expansion cards that have "lost out" during the isolation routine, a signal LOSE_ISO is asserted. This causes the state machine on those expansion cards to transition from the ISOLATION state back to the SLEEP state. The expansion cards that are placed into the SLEEP state withdraw from further participation in the current isolation process.

Once an expansion card is isolated and assigned a CSN value, it transitions to the CONFIG state. In the CONFIG state, the expansion card is responsive to a resource data read cycle. The resource data read cycle is decoded when the ADDRESS port and the READ_DATA port are accessed and the ISA read command strobe IORC* is issued. The ADDRESS port must be written with the proper address port value. Once all the resource data has been read from the expansion card, the system BIOS issues a WAKE command, writing the wake data latch 418 with the value zero to send the state machine back to a SLEEP state.

The state machine can also transition from the ISOLATION state to the SLEEP state when a signal WAKE_NEQ_CSN is asserted high, which occurs when the wake data register 418 is written with a value that is not equal to CSN. The signal WAKE_NEQ_CSN being asserted high also causes the state machine to transition from the CONFIG state back to the SLEEP state. It is noted that if the CSN value is set equal to 0, the signal WAKE_NEQ_CSN would be equivalent to the inverted state of the signal WAKE_EQ_ZERO. When that occurs, the expansion card that has been assigned the non-zero CSN value transitions from the CONFIG state back to the SLEEP state while all the expansion cards that were in the SLEEP state as a result of "losing out" during the isolation process transition from the SLEEP state to the ISOLATION state. As a result, the expansion card that has been assigned a unique CSN value is kept in the SLEEP state while the remaining expansion cards are subjected to the isolation process. The isolation process is repeated until all Plug and Play expansion cards connected to the ISA slots 316 are assigned unique CSN values. The expansion cards with assigned non-zero CSN's would not respond to the signals WAKE_EQ_ZERO and CSN_EQ_ZERO being asserted high. Once all the expansion cards have been assigned a CSN value, they all end up ultimately in the SLEEP state. The expansion cards stay in the SLEEP state until a signal WAKE_EQ_CSN is asserted high and the signal WAKE_EQ_ZERO is deasserted low. The signal WAKE_EQ_CSN is asserted high when the wake data register 418 is written with a value equal to CSN[7:0]. When the signals WAKE_EQ_CSN and WAKE_EQ_ZERO are asserted high and low, respectively, the expansion card with the matching CSN value transitions from the SLEEP state to the CONFIG state, where configuration registers on the expansion card is programmed with the appropriate data. From the CONFIG state, control can return back to the WAIT FOR KEY state upon issuance of the WAIT FOR KEY command, which causes the signal WAIT_CMD to be asserted. It is also noted that the state machine transitions to the WAIT FOR KEY state from any state upon assertion of the system reset signal RST*.

Figure 1:
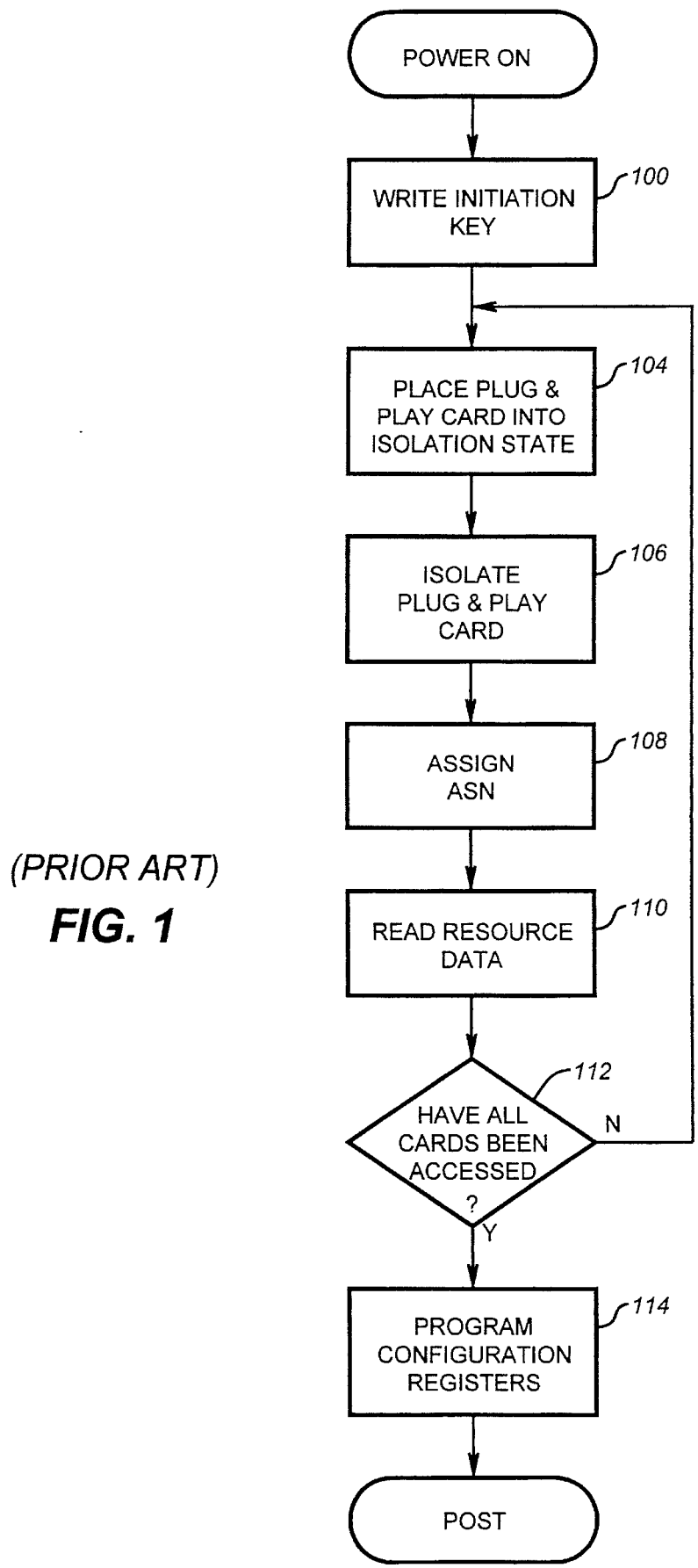
FIG. 1 is a flowchart of the Plug and Play isolation and configuration process.
Figure 2:
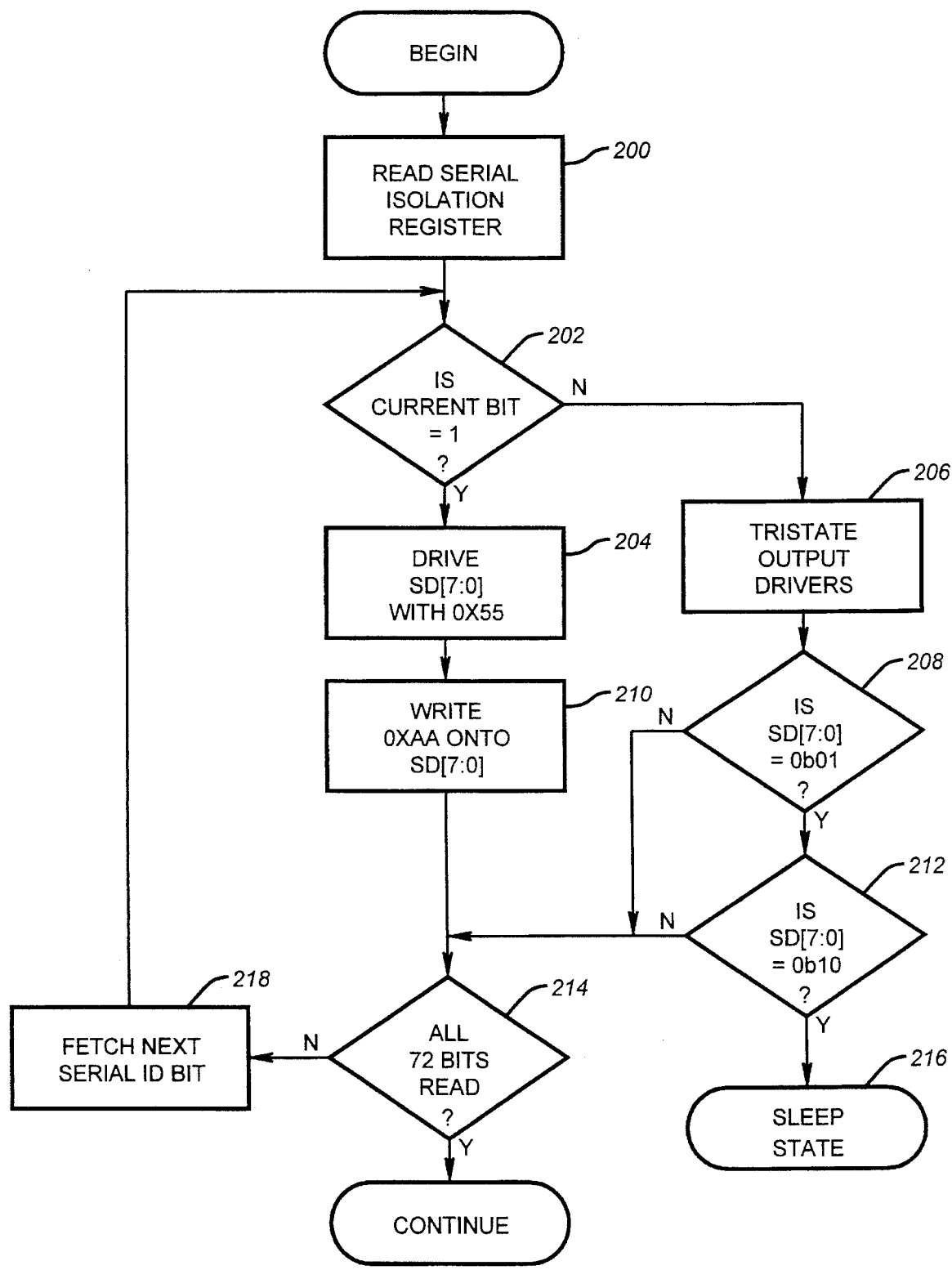
FIG. 2 is a flowchart of the output driving logic of a Plug and Play device during isolation.

Referring now to FIG. 8, logic on the audio/modem card 318 responsive to the isolation process executed by the system BIOS is shown. Three D flip-flops 700, 702 and 704 provide signals ISO_55, LOSE_ISO and ISO_CYCLE, respectively. The signal ISO_55, when set high, indicates that the data bus SD[7:0] is being driven with the value 0×55. The signal LOSE_ISO being set high indicates that the audio/modem card 318 has "lost out" in the current isolation process. The signal ISO_CYCLE indicates the phase of the serial isolation register read cycle. As described in FIG. 2, a pair of reads are performed for each bit of the serial isolation register. Thus, if the signal ISO_CYCLE is low, that indicates the first read is being performed. If the signal ISO_CYCLE is asserted high, then that indicates the second read of the same serial isolation register bit is being performed. The three D flip-flops 700–704 are clocked on the rising edge of the clock signal CLK, and are reset on the falling edge of the output of an AND gate 706. The first input of the AND gate 706 is tied to the system reset signal RST*, and the second input is tied to the inverted state of the signal SLEEP_ST, which indicates that the audio/modem card 318 is in the SLEEP state. Thus if the reset signal RST* is asserted low or the signal SLEEP_ST is asserted high, then the D flip-flops 700, 702 and 704 would all be reset low. The D inputs of the D flip-flops 700, 702 and 704 are connected to the outputs of multiplexors 708, 710 and 712, respectively. The S1 input of the multiplexor 708 is connected to the output of an AND gate 726, and its S0 input is connected to the output of an AND gate 716. The I0 input of the multiplexor 708 is connected to the signal ISO_55, the I1 input is tied high, and the I2 input is tied low. The S1 input of the multiplexor 710 is connected to the output of the AND gate 714 and its S0 input is tied to the output of an AND gate 718. The I0 input of the multiplexor 710 is connected to the signal LOSE_ISO, the I1 input is tied low, and the I2 input is tied high. For the multiplexor 712, the S1 input is tied to the output of the AND gate 726, and the S0 input is tied to the output of an AND gate 720. The I0 input of the multiplexor 712 is connected to the signal ISO_CYCLE, the I1 input is tied high, and the I2 input is tied low.

The inputs of the AND gate 714 are connected to the output of an AND gate 724 and the output of an AND gate 726. The inputs of the AND gate 724 are connected to the signal ISO_55, the inverted state of a signal ISOKEY and the output of a comparator 734. The comparator 734 compares the value of the signals ISO_SD[1:0], which is the latched values of the data bus SD[1:0], with the value 0b10. A match indicated by the comparator 734 signifies that the ISA data bus SD[7:0] is being driven with the value 0×AA. The inputs of the AND gate 726 are connected to the signal ISO_CYCLE and the output of an AND gate 732, whose inputs are connected to a signal RD_ISO_D and the inverted state of a signal RD_ISO. The signal RD_ISO, when asserted high, indicates that a read of the serial isolation register is occurring. The signal RD_ISO_D is equivalent to the signal RD_ISO delayed by one CLK cycle. The output of the AND gate 732 is connected to the input of an inverter 728, whose output drives an input of the AND gate 718. The other input of the AND gate 718 is connected to the signal LOSE_ISO. The output of the AND gate 732 is also connected to an input of the AND gate 720, whose other input is connected to the inverted state of the signal ISO_CYCLE. The output of the AND gate 720 is provided to an input of the AND gate 716. The other input of the AND gate 716 is connected to the output of an AND gate 722. The first input of the AND gate 722 is connected to the inverted state of the signal ISOKEY, and its second input is connected to the output of a comparator 730, which compares the value of the signals ISO_SD[1:0] with the value 0b01. Thus, if the ISA data bus SD[7:0] is being driven with the value 0×55, the comparator 730 outputs a high state. The signal ISOKEY represents the current bit read from the serial isolation register. During the isolation process, the isolation register contains two bytes of the expansion card serial identifier. If the current bit of the serial identifier is a 0, which means that the signal ISOKEY is low, and the value 0×55 is driven on the data bus SD[7:0] by at least one other expansion card, the AND gate 722 drives its output high. As can be seen from the logic, if the current bit of the serial identifier is high, then the D flip-flops 700 and 702 are maintained in their off state. The only signal that is allowed to change is the signal ISO_CYCLE corresponding to the D flip-flop 704. The reason for ignoring the states of the signals ISO_55 and LOSE_ISO, when the current serial identifier bit is a 1, is that such an expansion card is actively driving the data bus SD[7:0] with the values 0×55 and 0×AA in the first and second read cycles, respectively. As a consequence, the expansion card would not "lose out" in the current isolation process. When the first read of the serial isolation register is being performed, the signal ISO_CYCLE is low, which causes the AND gate 720 to output a high. As a result, the output of the AND gate 716 to also driven high. Since the output of the AND gate 726 at this time is low, the I1 input of the multiplexor 708 is selected, and its value provided to the D input of the D flip-flop 700. As a result, the D flip-flop 700 is latched with the value 1 on the rising edge of the CLK, thereby driving the signal ISO_55 high. Because the signal LOSE_ISO is initialized to low, the AND gate 718 initially outputs a low. Since both the outputs of the AND gate 714 and 718 are low at this time, the multiplexor 710 selects its I0 input, which maintains the signal LOSE_ISO at its current state. Because the signal is initialized low, indicating that the first read is performed, the output of the AND gate 720 is driven high, which causes the multiplexor 712 to select its I1 input. As a result, a 1 is loaded into the D flip-flop 704 to drive the signal ISO_CYCLE high. When this occurs, the AND gate 726 drives its output high. At the same time, the expansion cards that were driving the value 0×55 onto the data bus SD[7:0] now drive the value 0×AA. This causes the comparator 734 to output a high state. Since the signal ISO_55 has been set high and the signal ISOKEY, which represents the current bit of the serial identifier, is low, the AND gate 724 drives its output high, which causes the AND gate 714 to drive its output high, which in turn causes each of the multiplexors 708, 710 and 712 to select its I2 input. As a result, on the next rising edge of the signal CLK, the D flip-flop 700 sets the signal ISO_55 low, the D flip-flop 702 sets the signal LOSE_ISO high and the D flip-flop 704 sets the signal ISO_CYCLE low.

Figure 9A:
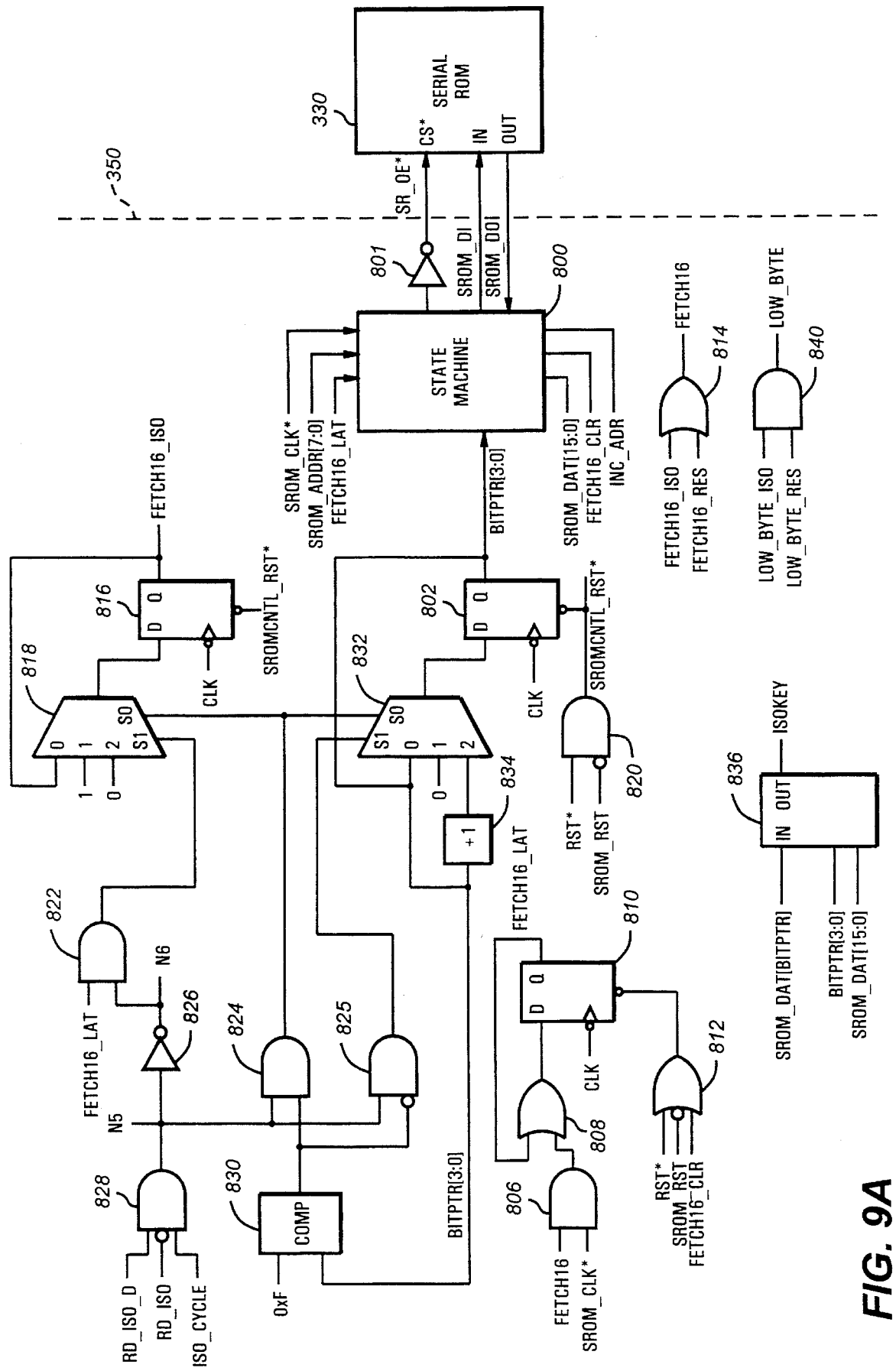
FIGS. 9A and 9B are a schematic diagram of the EEPROM interface.
Figure 9B:
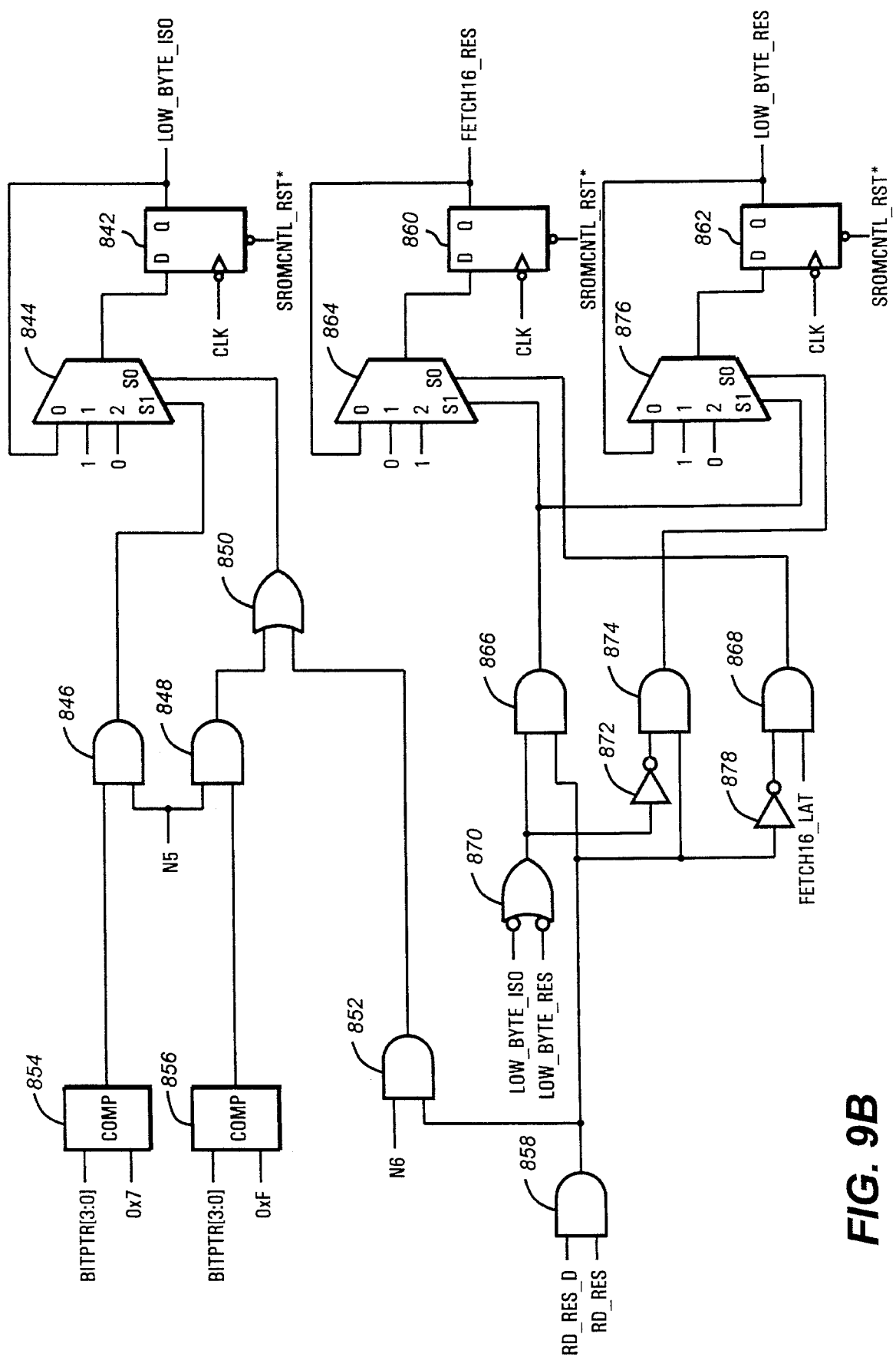

Referring now to FIGS. 9A and 9B, a logic diagram is shown of the serial EEPROM interface in the Plug and Play logic 351. A state machine 800 is shown connected to the serial EEPROM 330. The state machine 800 provides a signal SROM_CS, which is the chip select signal, and a signal SROM_DI, which is connected to the serial input to the serial EEPROM 330. The signal SROM_CS is connected to the input of an inverter 801. The output of the inverter 801 drives a signal SR_OE*, which is connected to the output enable input of the serial EEPROM 330. The serial output of the serial EEPROM 330 is connected to the state machine 800 via a signal SROM_DO. A ROM address SROM_ADDR[7:0] is provided to the state machine 800 that is representative of a location in the serial EEPROM 330. The state machine 800 is clocked by a signal SROM_CLK*, an active low signal, whose frequency is preferably 80 times less than the frequency of the signal CLK. The other inputs to the state machine 800 are signals BITPTR[3:0], which is a pointer to a bit in the serial isolation register located in the state machine 800, and a signal FETCH16_LAT, which indicates when asserted to the state machine 800 that the next two bytes of data are to be retrieved from the serial EEPROM 330. The other outputs of the state machine 800 are a signal INC_ADR, which indicates that the ROM address SROM_ADDR[7:0] is to be incremented, signals SROM_DAT[15:0], which correspond to the outputs of the serial isolation register, and a signal FETCH16_CLR, which when asserted causes the signal FETCH16_LAT to be reset low. The state diagram of the state machine 800 is shown in FIG. 10.

Figure 10:
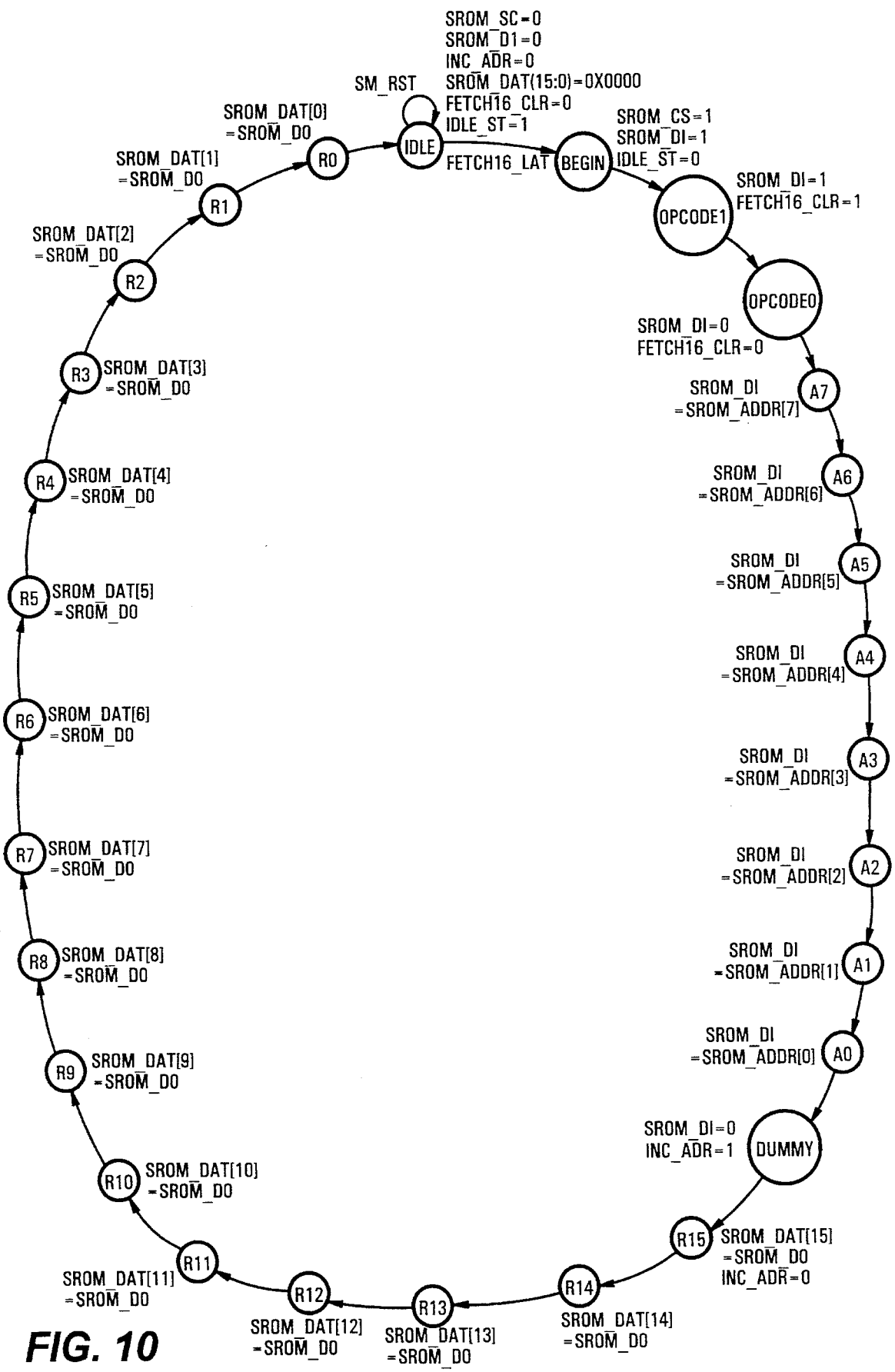
FIG. 10 is a state diagram of the state machine that reads data from the serial EEPROM.

Referring now to FIG. 10, the state machine starts out in state IDLE. In state IDLE, the contents of the serial isolation register SROM_DAT[15:0] are set to 0×0000. The signals INC_ADR, SROM_DI, FETCH16_CLR and SROM_CS are all set low. The signal IDLE_ST is set high to indicate that the state machine 800 is currently idle. Since the signal SROM_CS is low, the serial EEPROM 330 is not selected. When a signal FETCH16_LAT (provided by logic in FIG. 9) is asserted high, the state machine 800 recognizes that data is being requested from the serial EEPROM 330. As a result, the state machine 800 transitions to state BEGIN, where the signal SROM_CS is set high to enable the serial EEPROM 330. The serial input SROM_DI to the EEPROM 330 is also set high. In state BEGIN, the signal IDLE_ST is set low to indicate that the state machine 800 is now active. On the next positive edge of the clock SROM_CLK*, the state machine 800 transitions to state OPCODE1, where the signal SROM_DI is maintained high and the signal FETCH16_CLR is set high to reset the signal FETCH16_LAT. On the next rising edge of the clock SROM_CLK*, control proceeds to state OPCODE0, where the signals SROM_DI and FETCH16_CLR are set low. From here on, all state transitions of the state machine 800 are assumed to occur on the rising edge of the clock SROM_CLK*. Next, the state machine 800 transitions to state A7. In state A7, the serial input SROM_DI of the serial EEPROM 330 is set to the state of the most significant ROM address bit SROM_ADDR[7]. Control proceeds next to state A6, where the serial input SROM_DI is set to SROM_ADDR[6]. Control proceeds in subsequent cycles to states A5, A4, A3, A2, A1 and A0, in the listed order, in which the serial input of the EEPROM 330 is set equal to address signals SROM_ADDR[5:0], respectively. This series of steps effectively loads the address SROM_ADDR[7:0] into the serial EEPROM 330. From state A0, the state machine 800 transitions to state DUMMY, where the serial input SROM_DI is set low, and the signal INC_ADR is set high to increment the ROM address SROM_ADDR[7:0]. Initially the ROM address will start at zero and this state, when repeated, causes the ROM address to step through the ROM. The ROM address counter is not shown but is of conventional design. From state DUMMY, control proceeds to state R15, where the serial output SROM_DO of the EEPROM 330 is read into bit 15 of the serial isolation register, SROM_DAT[15]. In state R15, the signal INC_ADR is reset low. From state R15, control proceeds to state R14, where the serial output SROM_DO of the EEPROM 330 is loaded into bit 14 of the serial isolation register, SROM_DAT[14]. In subsequent cycles, control proceeds to states R13, R12, R11, R10, R9, R8, R7, R6, R5, R4, R3, R2, R1 and R0, in that order, in which the signal SROM_DO is loaded into the remaining serial isolation register bits SROM_DAT[13:0], respectively. From state R0, control returns to state IDLE, where all the signals are set to their initial states. It is also noted that when a signal SM_RST is asserted, control is returned from any state to state IDLE. The signal SM_RST is asserted high after a write to the wake data register or on an assertion of the system reset signal RST*. In the manner described above, 16 bits of data are retrieved from the serial EEPROM 330 at the location indicated by the address SROM_ADDR[7:0].

Returning now to FIG. 9A, the signal FETCH16_LAT is provided by a D flip-flop 810. The D flip-flop 810 is clocked on the rising edge of CLK, and it is reset on the rising edge of the output of an OR gate 812. The inputs of the OR gate are connected to the inverted state of the system reset signal RST*, the signal SROM_RST and the signal FETCH16_CLR. The signal SROM_RST is asserted after a write to the wake data register. The D input of the D flip-flop 810 is connected to the output of an OR gate 808. The first input of the OR gate 808 is connected to the signal FETCH16_LAT, and its second input is connected to the output of an AND gate 806. The AND gate 806 is connected to a signal FETCH16 and to the signal SROM_CLK*. Thus, if the D flip-flop 810 is set high, it stays in a high state until reset. To set the D flip-flop 810, the signals FETCH16 and SROM_CLK* must both be high. The signal FETCH16 is provided by an OR gate 814, whose inputs are connected to signal FETCH16_ISO and signal FETCH16_RES. The setting of the D flip-flop 810 is qualified by the clock signal SROM_CLK* to ensure that a race condition does not occur in the state machine 800 between the signals SROM_CLK* and FETCH16_LAT. The signal FETCH16_ISO indicates that the serial identifier of the audio/modem card 318 is to be retrieved from the serial EEPROM 330 during the expansion card isolation process. In the preferred embodiment, the serial identifier is 8 bytes in length. The signal FETCH16_RES indicates that the systems resource data are to be retrieved from the serial EEPROM 330 during a resource data read cycle. The signal FETCH16_ISO is provided by a D flip-flop 816, which is clocked by the rising edge of CLK and is reset on the falling edge of a signal SROMCNTL_RST*. The signal SROMCNTL_RST* is provided by an AND gate 820, whose first input is connected to the system reset signal RST* and second input is connected to the inverted state of the signal SROM_RST. The D flip-flop 816 is reset high to ensure that the signal FETCH16_LAT is asserted to the state machine 800 after a reset cycle. The D input of the D flip-flop 816 is connected to the output of a multiplexor 818. The I0 input of the multiplexor 818 is connected to the signal FETCH16_ISO. The I1 input of the multiplexor 818 is tied high and its I2 input is tied low. The S1 input of the multiplexor 818 is connected to the output of an AND gate 822, and its S0 input is connected to the output of an AND gate 824. The inputs of the AND gate 822 are connected to the signal FETCH16_LAT and to the output of an inverter 826. The input of the inverter 826 is connected to the output of an AND gate 828, whose inputs are connected to the signal RD_ISO_D, the inverted state of the signal RD_ISO and to the signal ISO_CYCLE. The signal RD_ISO, when asserted high, indicates that a read is being performed to the serial isolation register located in the state machine 800. The signal RD_ISO_D is equivalent to the signal RD_ISO delayed by one CLK cycle. The signal ISO_CYCLE indicates the phase of the serial isolation register read cycle during the isolation process. Thus, the AND gate 828 outputs a 1 high CLK cycle after the isolation read signal RD_ISO has reset low and when the second phase of the serial isolation register read cycle is in progress. If the signal FETCH16_LAT is high and the output of the AND gate 828 is low, the D flip-flop 816 is latched with the value 0. This ensures that the signal FETCH16_ISO is reset low after the isolation process has completed. The output of the AND gate 828 is also connected to the first input of the AND gate 824. The second input of the AND gate 824 is connected to the output of a comparator 830, which compares the value of the pointer BITPTR[3:0] to the value 0xF. If a match occurs, indicating that 16 bits have been read from the serial isolation register, the comparator 830 outputs a 1, and if the output of the AND gate 828 is also high, the AND gate 824 causes the D flip-flop 816 to be set high.

The pointer BITPTR[3:0] is provided by a register 802, which is clocked on the rising edge of CLK and is reset on the falling edge of the signal SROMCNTL_RST*. The D input of the D flip-flop 802 is connected to the output of a four bit, three input multiplexor 832, whose I0 input is connected to the pointer BITPTR[3:0], whose I1 input is connected to 0x0, and whose I2 input is connected to the 4-bit output of an increment circuit 834. The S1 input of the multiplexor 832 is connected to the output of an AND gate 825, and its S2 input is connected to the output of the AND gate 824. Thus, when the AND gate 824 drives its output high, the value 0x0 is loaded into the register 802. The inputs of the AND gate 825 are connected to the output of the AND gate 828 and to the inverted state of the output of the comparator 830. Thus, if the signals BITPTR[3:0] are not equal to 0xF and the output of the AND gate 828 is high, then the multiplexor 832 selects the output of the increment circuit 834. This causes the signals BITPTR[3:0] to be incremented by 1 and latched into the register 802. The net effect of the logic described above is that during an isolation process, the value of the pointer BITPTR[3:0] is incremented once in each pair of reads to the serial isolation register.

As described earlier in FIG. 8, the signal ISOKEY is required to determine the current state of a selected bit of the serial identifier during the isolation process. The signal ISOKEY is assigned to the data value SROM_DAT[BITPTR[3:0]] by a latch 836. The signal is reassigned whenever either the signals BITPTR[3:0] or SROM_DAT[15:0] change state. As noted above, the pointer BITPTR[3:0] points to the current location of the serial isolation register.

During the resource data read stage, the system BIOS expects the resource data to be outputted one byte at a time.

Since the serial isolation register, which is also used to store the system resource data, consists of 16 bits of data, a signal is required to indicate which half is to be provided to the system BIOS. That function is provided by a signal LOW_BYTE, which is connected to the output of an AND gate 840. The inputs of the AND gate 840 are connected to signals LOW_BYTE_ISO and LOW_BYTE_RES. Thus, whenever both the signals LOW_BYTE_ISO and LOW_BYTE_RES are deasserted high, the signal LOW_BYTE is deasserted high to indicate a high byte. The signal LOW_BYTE_ISO is provided to ensure that, after the isolation process has completed reading the 8 bytes of the serial identifier, the first read of the resource data from the isolation register is from the high byte.

The signal LOW_BYTE_ISO is provided by a D flip-flop 842. The D flip-flop 842 is clocked on the rising edge of CLK and is reset high on the falling edge of the signal SROMCNTL_RST*. The D input of the D flip-flop 842 is connected to the output of a multiplexor 844. The I0 input of the multiplexor 844 is connected to the signal LOW_BYTE_ISO, the I1 input is tied high and the I2 input is tied low. The S1 input of the multiplexor 844 is provided by the output of an AND gate 846, and the S0 input is provided by the output of an OR gate 850. The inputs of the OR gate 850 are connected to the output of an AND gate 848 and the output of an AND gate 852. The first inputs of both AND gates 846 and 848 are connected to the output of the AND gate 828. The second input of the AND gate 846 is connected to the output of a comparator 854, and the second input of the AND gate 848 is connected to the output of a comparator 856. The comparator 854 compares the value of BITPTR[3:0] to 0×7, and the comparator 856 compares BITPTR[3:0] to 0×F. The first input of the AND gate 852 is connected to the output of the inverter 826 and the second input is connected to the output of an AND gate 858, whose inputs are connected to signals RD_RES_D and RD_RES. The signal RD_RES being asserted high indicates that a read is to be performed to the serial isolation register to obtain the system resource data. The signal RD_RES_D is equivalent to RD_RES delayed by one CLK cycle. Thus, if the pointer BIT_PTR[3:0] is equal to the value 0×7, and the AND gate 828 drives its output high, the multiplexor 844 loads a 0 into the D flip-flop 842 to indicate that the high half of the serial isolation register is about to be accessed during the isolation process. However, if the pointer BIT_PTR[3:0] is equal to the value 0×F and the output of the AND gate 828 is high, indicating that the low half of the isolation register is about to be accessed, or if the outputs of the AND gate 858 and the inverter 826 are high, indicating that the isolation process has ended and the resource data read cycle has begun, then the multiplexor 844 writes a 1 into the D flip-flop 842.

The signal FETCH16_RES is provided by a D flip-flop 860 and the signal LOW_BYTE_RES is provided by a D flip-flop 862. Both D flip-flops 860 and 862 are clocked on the rising edge of CLK and are reset on the falling edge of the signal SROMCNTL_RST*. The D input to the D flip-flop 860 is connected to the output of a multiplexor 864, whose I0 input is connected to the signal FETCH16_RES, I1 input is tied low and I2 input is tied high. The S1 input of the multiplexor 864 is connected to the output of an AND gate 866 and the S0 input is connected to the output of an AND gate 868. The first input of the AND gate 866 is connected to the output of an OR gate 870, whose inputs are connected to the inverted state of the signal LOW_BYTE_RES and the inverted state of the signal LOW_BYTE_ISO. The second input of the AND gate 866 is connected to the output of the AND gate 858. The output of the OR gate 870 is also connected to the input of an inverter 872, whose output is connected to the first input of an AND gate 874. The second input of the AND gate 874 is connected to the output of the AND gate 858. The D input of the D flip-flop 862 is connected to the output of a multiplexor 876. The I0 input of the multiplexor 876 is connected to the signal LOW_BYTE_RES, the I1 input is tied low and the I2 input is tied high. The S1 input of the multiplexor 876 is connected to the output of the AND gate 866 and the S0 input is connected to the output of the AND gate 874.

Thus, if both the signals LOW_BYTE_RES and LOW_BYTE_ISO are high, then the output of the OR gate 870 is low. If the output of the AND gate 858 is also high, which indicates that a resource data read cycle is occurring, then the multiplexor 876 loads a 0 into the D flip-flop 862, causing the signal LOW_BYTE_RES to fall low. If either of the signals LOW_BYTE_RES and LOW_BYTE_ISO is low, then the OR gate 870 outputs a 1. If the output of the AND gate 858 is also high, then the multiplexor 864 loads a 1 into the D flip-flop 860 and the multiplexor 876 loads a 1 into the D flip-flop 862. This indicates that the second byte of data is being read from the lower half of the serial isolation register. As a result, the signal FETCH16_RES is asserted high to cause the OR gate 840 to assert the signal FETCH16. The first input of the AND gate 868 is connected to the output of an inverter 878, whose input is connected to the output of the AND gate 858. The second input of the AND gate 868 is connected to the signal FETCH16_LAT. Thus, if the output of the AND gate 858 is low and the signal FETCH16_LAT is high, then the multiplexor 864 writes a 0 into the D flip-flop 860 to reset the signal FETCH16_RES low after the resource data read cycle has completed.

Figure 11:
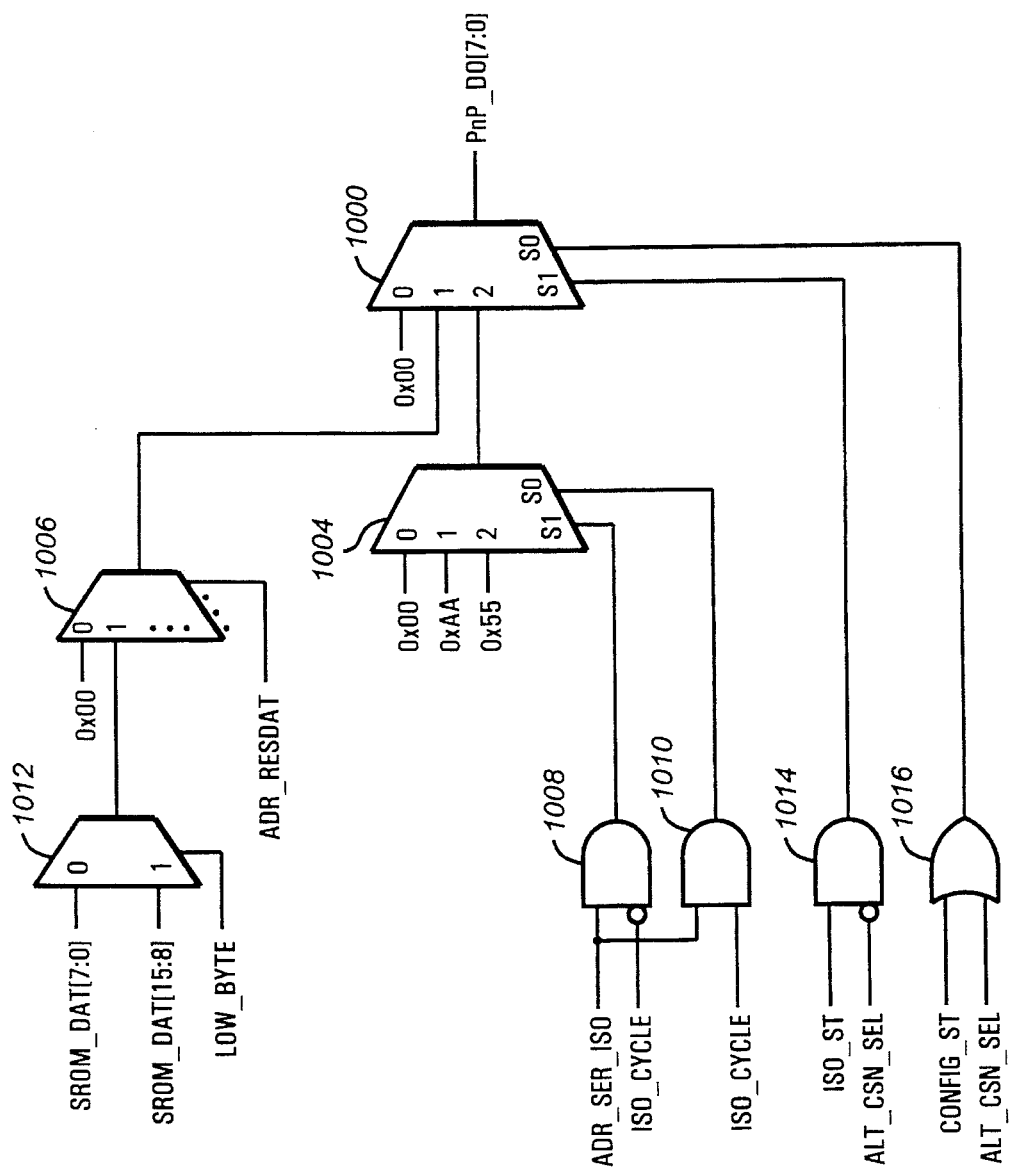
FIG. 11 is a schematic diagram of the output port of the device of FIG. 4.

Referring now to FIG. 11, a portion of the output circuitry of the expansion card is shown. A 4-to-1 multiplexor 1000 drives signals PNP_DO[7:0], which are ultimately provided to the system data bus SD[7:0]. The signals ISO and CONFIG are connected to the outputs of the AND gate 1014 and the OR gate 1014, respectively. The S1 input of the multiplexor 1000 is connected to the signal ISO and the $0 input is connected to the signal CONFIG. The first input of the AND gate 1014 is connected to the signal ISO_ST and a second input is connected to the inverted state of the signal ALT_CSN_SEL. The first input of the OR gate 1016 is connected to the signal CONFIG_ST and the second input is connected to the ALT_CSN_SEL. Thus, if the audio/ modem card 318 is in the ISOLATION state, which is indicated by the signal ISO_ST being asserted high, and the card 318 is not in one of the two alternative configuration modes, indicated by the signal ALT_CSN_SEL being asserted high, the I2 input of the multiplexor 1000 is selected. The I2 input is connected to the output of a multiplexor 1004. The S1 input of the multiplexor 1004 is connected to the output of an AND gate 1008, and the S0 is connected to the output of an AND gate 1010. The first inputs of the AND gates 1008 and 1010 are connected to a signal ADR_SER_ISO, which indicates when asserted that the serial isolation register is being addressed during the isolation process. The second input of the AND gate 1008 is connected to the inverted state of the signal ISO_CYCLE. The second input of the AND gate 1010 is connected the signal ISO_CYCLE. If the output of the AND gate 1008 is high, then the multiplexor 1004 drives the value 0×55 through the multiplexors 1000 and 1004. However, if the output of the AND gate 1010 is high, then the multiplexor 1004 drives the value 0×AA. Thus, during the first phase of the isolation register read cycle during the isolation process, the multiplexor 1004 drives the value 0×55. During the second phase, the multiplexor 1004 drives the value 0×AA.

If the audio/modem card 318 is in the CONFIG state, as indicated by the signal CONFIG_ST being asserted high, or if one of the alternative configuration modes indicated by the signal ALT_CSN_SEL is asserted high, the OR gate 1016 selects the I1 input of the multiplexor 1000. The I1 input of the multiplexor 1000 is connected to the output of a multiplexor 1006. If the serial isolation register is being addressed during the resource data read cycle, a signal ADR_RESDAT is asserted high. This selects the I1 input of the multiplexor 1006, which is connected to the output of a multiplexor 1012. The multiplexor 1012 is selected by the signal LOW_BYTE. Thus, if the signal LOW_BYTE is low, the upper half of the serial isolation register SROM_DAT[15:8] is provided to the latch 1002. If the signal LOW_BYTE is high, however, the lower byte of the serial isolation register SROM_DAT[7:0] is provided to the latch 1002.

The default input of the multiplexors 1012, 1006 and 1000 are tied to the value 0. It is noted that other signals are provided to the inputs of the multiplexor 1006, which are selected by corresponding select signals. Those signals are not shown for the sake of clarity.

Figure 12:
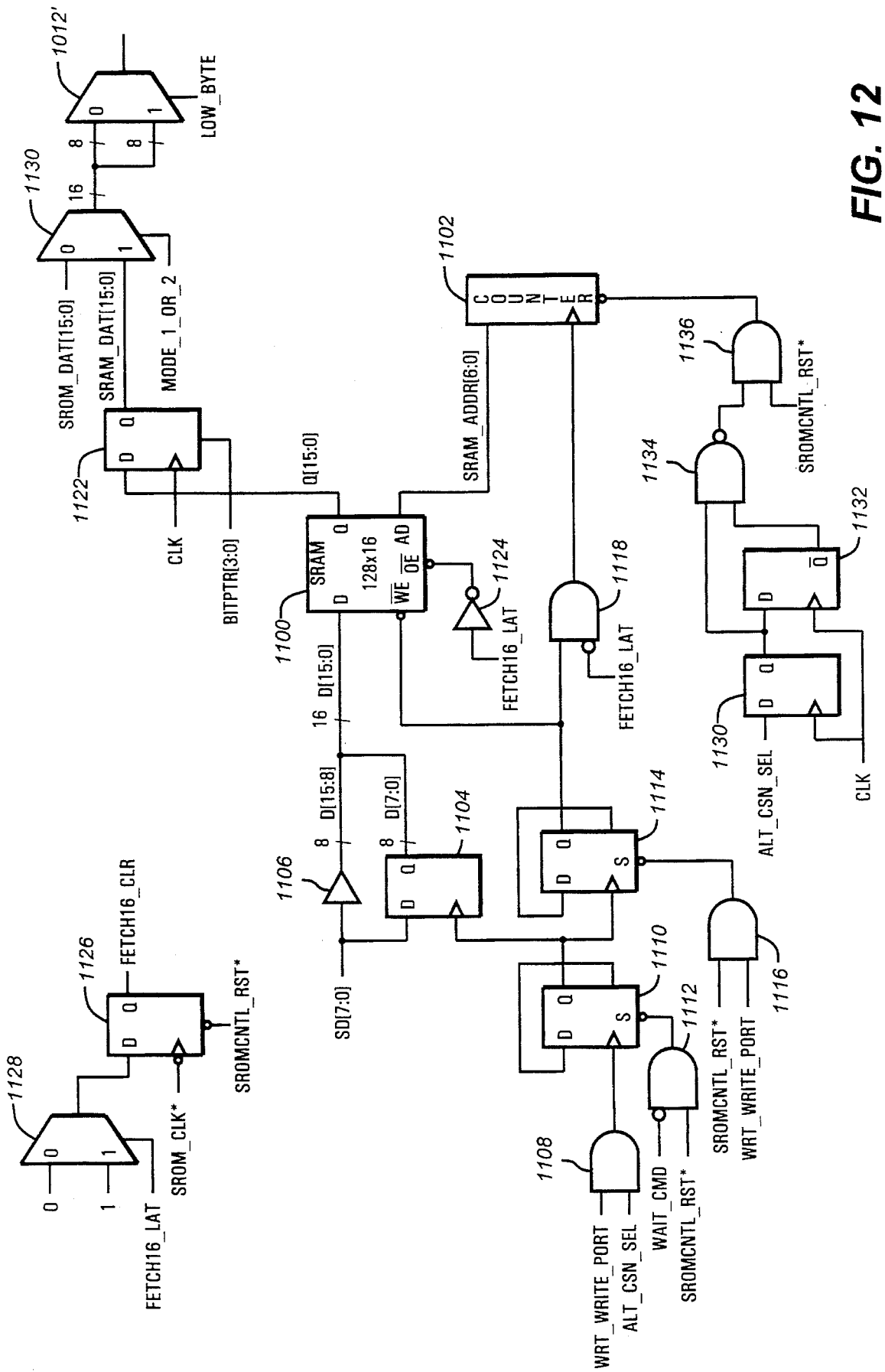
FIG. 12 is a schematic diagram of logic for receiving the serial identifier and resource data into a RAM.

Referring now to FIG. 12, the second embodiment of the present invention is shown. This embodiment also removes the need for a separate serial EEPROM 330 associated with the audio/modem card 318. A static random access memory (SRAM) 1100 is placed on the audio/modem card 318 to receive the serial identifier and the system resource data from the system BIOS. The system BIOS retrieves the serial identifier and the resource data from a storage device, preferably the BIOS ROM 324, and writes it into the SRAM 1100 before the Plug and Play configuration process is executed. The SRAM 1100 is organized as 128 words by 16 bits, and is addressed by the output of a 7-bit counter 1102. The output of the counter 1102 is designated as address signals SRAM_ADDR[6:0]. Because the audio/modem card 318 is connected only to an 8-bit data bus SD[7:0], a register 1104 is provided to store the lower byte of the data input, represented as data signals D[7:0], into the SRAM 1100. The upper byte of the data input, represented as data signals D[15:8], is provided by an 8-bit buffer 1106. The D input of the register 1104 and the input of the 8-bit buffer are both connected to the data bus SD[7:0]. The clock input of the register 1104 is provided by the Q output of a D flip-flop 1110. The D input of the D flip flop 1110 is connected to its Q* output. Thus, the D flip flop 1110 effectively functions as a toggle flip flop. The clock input of the D flip-flop 1110 is connected to the output of an AND gate 1108, whose inputs are connected to the signals WRT_WRITE_PORT and ALT_CSN_SEL. The signal ALT_CSN_SEL is included to ensure that the write operation to the SRAM 1100 occurs only if an alternative configuration mode is selected. The D flip flop 1110 is set to a high state on the falling edge of the output of an AND gate 1112, whose inputs are connected to the inverted state of the signal WAIT_CMD and the signal SROMCNTL_RST*. The Q output of the D flip flop 1110 is connected to the clock input of a D flip flop 1114, which is similarly configured as a toggle flip flop. The D flip flop 1114 is set high on the falling edge of the output of an AND gate 1116, whose inputs are connected to the signal SROM-CNTL_RST* and WRT_WRITE_PORT. The Q output of the D flip flop 1114 is connected to the write enable input of the SRAM 1100. If the output of the D flip flop 1114 is asserted low, then the SRAM 1100 can be written through its data input D[15:0] at a location determined by the counter 1102. The output of the D flip flop 1114 is also connected to an input of an AND gate 1118, whose other input is connected to the inverted state of the signal FETCH16_LAT. The output of the AND gate is provided to the clock input of the counter 1102. The counter 1102 is reset on the falling edge of the output of an AND gate 1136, which receives the SROMCNTL_RST* signal at one input. The second input is provided by the output of a NAND gate 1134. The NAND gate 1134 receives the inverted output of a D-type flip-flop 1132 and the non-inverted output of a D-type flip-flop 1130, which is also connected to the D input of the flip-flop 1132. The D input of the flip-flop 1130 receives the ALT_CSN_SEL signal. The flip-flops 1130 and 1132 are clocked by the CLK signal.

Thus, when the two signals WRT_WRITE_PORT and ALT_CSN_SEL are asserted high, the AND gate 1108 asserts a 1 at its output, causing the D flip flop 1110 to toggle low. This causes the D flip flop 1104 to latch in the data on the data bus SD[7:0]. On the next rising edge of the signal WRT_WRITE_PORT, the D flip flop 1110 toggles high, causing the D flip flop 1114 to toggle low. The write enable input of the SRAM 1100 is thus driven active low, and the lower and upper bytes of data presented by the D flip flop 1104 and the buffer 1106 are written into the SRAM 1100. When the signal WRT_WRITE_PORT next falls low, the output of the AND gate 1116 is driven low to reset the D flip flop 1114 high, thereby disabling the write enable input of the SRAM 1100. However, at the same time, the output of the OR gate 1118 is driven high, causing the counter 1102 to increment. Thus, the next write access will be to the next word in the SRAM 1100. This process is continued until the serial identifier and all the system resource data have been written to the SRAM 1100. After the final write to the SRAM 1100, the system BIOS issues a WAIT FOR KEY command, represented by the assertion of the signal WAIT_CMD, to place the Plug and Play logic 351 into the WAIT FOR KEY state.

The serial identifier and resource data can thus be retrieved from the SRAM 1100 during the Plug and Play configuration mode. In the second embodiment, the asserted signal ALT_CSN_SEL disables the state machine 800, which provides the serial identifier and resource data via signals SROM_DAT[15:0] during the standard configuration mode. The serial identifier and resource data are read from the SRAM 1100 and provided to an alternative 16-bit serial isolation register 1122, which outputs signals SRAM DAT[15:0]. The output enable input of the SRAM 1100 is provided by an inverter 1124, whose input is connected to the signal FETCH16_LAT. When the signal FETCH16_LAT is asserted, the inverter 1124 enables the SRAM 1100 to be read. The signal FETCH16_LAT is also provided to the select input of a multiplexor 1128, whose I1 input is pulled to ground and I2 input is tied high. The output of the multiplexor 1128 is connected to the D input of a D flip flop 1126. The D flip flop 1126 is clocked on the falling edge of the signal SROM_CLK* and is reset by the signal SROM-CNTL_RST*. If the signal FETCH16_LAT is asserted high, the D flip flop 1126 is set high on the falling edge of the signal SROM_CLK*. This drives the signal FETCH16_CLR, which is provided to the D flip flop 810 (FIG. 9A) to reset the signal FETCH16_LAT low. When the signal FETCH16_LAT is reset, the next falling edge of the signal SROM_CLK* causes the signal FETCH16_CLR to reset low. The falling edge of the signal FETCH16_LAT also causes the counter 1102 to increment.

The output data from the SRAM 1100, represented by signals Q[15:0], are loaded into the register 1122 on the next rising edge of CLK. The pointer BITPTR[3:0] is provided to the register 1122 to point to the current bit of the register 1122 in an isolation register read cycle during the isolation process. The output of the register 1122 is connected to the I1 input of a 2-to-1 multiplexor 1130. The I0 input of the multiplexor 1130 is connected to the signals SROM_DAT [15:0] from the isolation register in the state machine 800. The select input of the multiplexor 1130 is connected to the signal MODE_1_OR_2. Thus, if Plug and Play logic 351 is placed into either first or second alternative configuration modes, the output of the register 1122 is selected, wherein the lower byte is provided to the I0 input of a multiplexor 1012' and the upper byte is provided to its I1 input. In the second embodiment, the multiplexor 1012' replaces the multiplexor 1012 of FIG. 10. Also, in FIG. 5, the input of the OR gate 406 that was connected to the signal ALT_CSN_SEL is tied to ground. The second embodiment thus places the serial identifier and resource data into an SRAM 1100 located on the audio/modem card 318. Additionally, the output of the multiplexor 1130 is provided to the isolation key latch 836 so that the ISOKEY signal can be properly developed. Further, the ISO_ST and CONFIG_ST signals are provided directly to the select inputs of the multiplexor 1000. Also, the output of the NAND gate 1134 is used to reset the register 816. After the data is properly written, a zero value is written to the register 402 to deassert the ALT_CSN_SEL signal, so that data cannot be written to the SRAM 1100. The Plug and Play configuration process is then invoked, wherein the system BIOS performs the key initiation, the isolation process, the CSN assignment, and the configuration register programming. Therefore in this second embodiment the SRAM 1100 then emulates the serial EEPROM 330 during the Plug and Play isolation and configuration process.

Thus, a circuit has been described that allows a Plug and Play expansion card to be configured in one of three ways. The first is the standard Plug and Play configuration method, wherein expansion cards go through the isolation process to obtain unique Card Select Numbers (CSN) using a dedicated serial EEPROM to store the serial identifier and system resource data for the expansion cards. However, when an expansion card is directly mounted onto a system board, it becomes a system board device. This allows the separate serial EEPROM to be removed. To implement this case, two embodiments, each with two alternative configuration modes are provided, wherein the expansion card can be configured under main CPU control. In these alternative modes, the configuration data is stored in the main system BIOS ROM. In the first mode, a register in the expansion card is mapped to a fixed ISA I/O address. In the second mode, the register is controlled by a dedicated pin, thus allowing it to be mapped to any ISA I/O address. To determine which configuration mode is used by the expansion card, pullup or pulldown resistors are connected to certain expansion card output pins. In the first embodiment, the configuration data is written directly into the configuration registers without requiring the Plug and Play isolation and configuration process. In the second embodiment a static random access memory (SRAM) is utilized to store the serial identifier and the resource data. In this embodiment, the system BIOS initially writes the serial identifier and resource data into the SRAM. After this is done, a Plug and Play configuration process is invoked, in which the serial identifier is retrieved from the SRAM rather than the serial EEPROM.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. An improved expansion bus device for use with a computer system having both said improved expansion bus device and other expansion bus devices, wherein the computer system can obtain device specific initialization information from the other expansion bus devices which individually include a nonvolatile storage device for storing such initialization information and wherein the computer system provides configuration information to both said improved expansion bus device and to said other expansion bus devices based on the initialization information according to a predetermined automatic expansion configuration sequence, and wherein the computer system can further store appropriate configuration information on the improved expansion bus device and provide the configuration information to the improved expansion bus device without utilizing said predetermined automatic expansion configuration sequence, said improved expansion bus device having first and second configuration modes, wherein a non-volatile storage device for storing said initialization information is connected to said improved expansion bus device for configuration mode operation, said improved expansion bus device comprising:

means for determining said first configuration mode and said second configuration mode for said improved expansion bus device;

means for storing the configuration information of said improved expansion bus device received from the computer system;

means responsive to said first configuration mode for retrieving said initialization information from the non-volatile storage device and providing said initialization information to the computer system and for receiving the configuration information from the computer system and storing the configuration information in said configuration storing means, said means responsive to said first configuration mode responding according to the predetermined automatic expansion configuration sequence; and means responsive to said second configuration mode for receiving the configuration information from the computer system and storing the configuration information in said configuration storing means without providing said initialization information to the computer system, said means responsive to said second configuration mode responding without following the predetermined automatic expansion configuration sequence, said means responsive to said second configuration mode including a register settable to an active state by the computer system to enable receipt of the configuration information and being responsive to a fixed address.

2. The expansion bus device of claim 1, wherein said configuration information storing means includes a plurality of registers.

3. The expansion bus device of claim 1, wherein the predetermined automatic expansion configuration sequence is defined according to the Plug and Play standard.

4. An improved expansion bus device for use with a computer system having both said improved expansion bus device and other expansion bus device, wherein the computer system can obtain device specific initialization information from the other expansion bus devices which individually include a non-volatile storage device for storing such initialization information and wherein the computer system provides configuration information to both said improved expansion bus device and to said other expansion bus devices based on the initialization information according to a predetermined automatic expansion configuration sequence and wherein the computer system can further store initialization information on the improved expansion bus device and provide the initialization information to the improved expansion bus device prior to utilizing said predetermined automatic expansion configuration sequence and wherein the computer system including non-volatile memory for storing system BIOS information and wherein said initialization information is stored in said non-volatile memory, said improved expansion bus device having first and second configuration modes, wherein a non-volatile storage device for storing said initialization information is connected to said improved expansion bus device for first configuration mode operation, said improved expansion bus device comprising:

- means for determining said first configuration mode and said second configuration mode;
- a volatile storage device for storing the initialization information received from the computer system;
- means for storing the configuration information of the improved expansion bus device received from the computer system;
- means responsive to said first configuration mode for retrieving said initialization information from said non-volatile storage device and providing said initialization information to the computer system and for receiving the configuration information from the computer system and storing the configuration information in said configuration information storing means, said means responsive to said first configuration mode responding according to the predetermined automatic expansion configuration sequence; and
- means responsive to said second configuration mode for receiving said initialization information from the computer system and storing said initialization information in said volatile storage device, and for retrieving said initialization information from said volatile storage device and providing said initialization information to the computer system and also for receiving the configuration information from the computer system and storing the configuration information in said configuration information storing means, said means responsive to said second configuration mode responding according to the predetermined automatic expansion configuration sequence after receiving said initialization information from the computer system, wherein said means responsive to said second configuration mode is responsive to a fixed address.

5. The expansion bus device of claim 4, wherein said configuration information storing means includes a plurality of registers.

6. The expansion bus device of claim 4, wherein said volatile storage device is a static random access memory.

7. The expansion bus device of claim 4, wherein the predetermined automatic expansion configuration sequence is defined according to the Plug and Play standard.

8. An improved expansion bus device for use with a computer system having both said improved expansion bus device and other expansion bus device, wherein the computer system can obtain device specific initialization information from the other expansion bus devices which individually include a non-volatile storage device for storing such initialization information and wherein the computer system provides configuration information to both said improved expansion bus device and to said other expansion bus devices based on the initialization information according to a predetermined automatic expansion configuration sequence and wherein the computer system can further store initialization information on the improved expansion bus device and provide the initialization information to the improved expansion bus device prior to utilizing said predetermined automatic expansion configuration sequence and wherein the computer system includes non-volatile memory for storing system BIOS information and wherein said initialization information is stored in said non-volatile memory, said improved expansion bus device comprising:

- a volatile storage device for storing the initialization information received from the computer system;
- means for storing the configuration information of the improved expansion bus device received from the computer system; and
- means for receiving said initialization information from the computer system and storing said initialization information in said volatile storage device, and for retrieving said initialization information from said volatile storage device and providing said initialization information back to the computer system and also for receiving the configuration information from the computer system and storing the configuration information in said configuration information storing means, said means for receiving responding according to the predetermined automatic expansion configuration sequence after receiving said initialization information from the computer system wherein said means for receiving said initialization information is responsive to a fixed address.

9. The expansion bus device of claim 8, wherein said configuration information storing means includes a plurality of registers.

10. The expansion bus device of claim 8, wherein said volatile storage device is a static random access memory.

11. The expansion bus device of claim 8, wherein the predetermined automatic expansion configuration sequence is defined according to the Plug and Play standard.

12. An improved expansion bus device for use with a computer system having both said improved expansion bus device and other expansion bus devices, wherein the computer system can obtain device specific initialization information from the other expansion bus devices which individually include a non-volatile storage device for storing such initialization information and wherein the computer system provides configuration information to both said improved expansion bus device and to said other expansion bus devices based on the initialization information according to a predetermined automatic expansion configuration sequence, and wherein the computer system can further store appropriate configuration information on the improved expansion bus device and provide the configuration information to the improved expansion bus device without utilizing said predetermined automatic expansion configuration sequence, said improved expansion bus device having first and second configuration modes, wherein a non-volatile storage device for storing said initialization information is connected to said improved expansion bus device for first configuration mode operation, said improved expansion bus device comprising:

- means for determining said first configuration mode and said second configuration mode for said improved expansion bus device;

means for storing the configuration information of said improved expansion bus device received from the computer system;

means responsive to said first configuration mode for retrieving said initialization information from the non-volatile storage device and providing said initialization information to the computer system and for receiving the configuration information from the computer system and storing the configuration information in said configuration storing means, said means responsive to said first configuration mode responding according to the predetermined automatic expansion configuration sequence; and means responsive to said second configuration mode for receiving the configuration information from the computer system and storing the configuration information in said configuration storing means without providing said initialization information to the computer system, said means responsive to said second configuration mode responding without following the predetermined automatic expansion configuration sequence, said means responsive to said second configuration mode including a register settable to an active state by the computer system to enable receipt of the configuration information and being responsive to a chip select signal from the computer system.

13. The improved expansion bus device of claim 12, wherein said configuration information storing means includes a plurality of registers.

14. The improved expansion bus device of claim 12, wherein the predetermined automatic expansion configuration sequence is defined according to the Plug and Play standard.

15. An improved expansion bus device for use with a computer system having both said improved expansion bus device and other expansion bus devices, wherein the computer system can obtain device specific initialization information from the other expansion bus devices which individually include a non-volatile storage device for storing such initialization information and wherein the computer system provides configuration information to both said improved expansion bus device and to said other expansion bus devices based on the initialization information according to a predetermined automatic expansion configuration sequence, and wherein the computer system can further store appropriate configuration information on the improved expansion bus device and provide the configuration information to the improved expansion bus device without utilizing said predetermined automatic expansion configuration sequence and wherein the computer system includes non-volatile memory for storing system BIOS information and wherein said initialization information is stored in said non-volatile memory, said improved expansion bus device having first and second configuration modes, wherein a non-volatile storage device for storing said initialization information is connected to said improved expansion bus device for first configuration mode operation, said improved expansion bus device comprising:

means for determining said first configuration mode and said second configuration mode for said improved expansion bus device;

a volatile storage device for storing the initialization information received from the computer system;

means for storing the configuration information of said improved expansion bus device received from the computer system;

means responsive to said first configuration mode for retrieving said initialization information from the non-volatile storage device and providing said initialization information to the computer system and for receiving the configuration information from the computer system and storing the configuration information in said configuration storing means, said means responsive to said first configuration mode responding according to the predetermined automatic expansion configuration sequence; and means responsive to said second configuration mode for receiving said initialization information from the computer system and storing said initialization information in said volatile storage device, and for retrieving said initialization information from said volatile storage device and providing said initialization information to the computer system and also for receiving the configuration information from the computer system and storing the configuration information in said configuration information storing means, said means responsive to said second configuration mode responding according to the predetermined automatic expansion configuration sequence after receiving said initialization information from the computer system, wherein said means responsive to said second configuration mode is responsive to a chip select signal from the computer system.

16. The improved expansion bus device of claim 15, wherein said configuration information storing means includes a plurality of registers.

17. The improved expansion bus device of claim 15, wherein said volatile storage device is a static random access memory.

18. The improved expansion bus device of claim 15, wherein said means responsive to said second configuration mode includes a register settable to an active state by the computer system to enable receipt of the configuration information.

19. An improved expansion bus device for use with a computer system having both said improved expansion bus device and other expansion bus device, wherein the computer system can obtain device specific initialization information from the other expansion bus devices which individually include a non-volatile storage device for storing such initialization information and wherein the computer system provides configuration information to both said improved expansion bus device and to said other expansion bus devices based on the initialization information according to a predetermined automatic expansion configuration sequence and wherein the computer system can further store initialization information on the improved expansion bus device and provide the initialization information to the improved expansion bus device prior to utilizing said predetermined automatic expansion configuration sequence and wherein the computer system includes non-volatile memory for storing system BIOS information and wherein said initialization information is stored in said non-volatile memory, said improved expansion bus device comprising:

a volatile storage device for storing the initialization information received from the computer system;

means for storing the configuration information of the improved expansion bus device received from the computer system; and means for receiving said initialization information from the computer system and storing said initialization information in said volatile storage device, and for retrieving said initialization information from said volatile storage device and providing said initialization information back to the computer system and also for receiving the configuration information from the computer system and storing the configuration information in said configuration information storing means, said means for receiving responding according to the predetermined automatic expansion configuration sequence after receiving said initialization information from the computer system, wherein said means for receiving the initialization information is responsive to a chip select signal from the computer system.

20. The improved expansion bus device of claim 19, wherein said configuration information storing means includes a plurality of registers.

21. The improved expansion bus device of claim 19, wherein said volatile storage device is a static random access memory.

22. The improved expansion bus device of claim 19, wherein the predetermined sequence is defined according to the Plug and Play standard.

* * * * *